US012373082B2

(12) United States Patent
Zhang et al.

(10) Patent No.: US 12,373,082 B2
(45) Date of Patent: Jul. 29, 2025

(54) CARD INFORMATION DISPLAY METHOD, ELECTRONIC DEVICE, AND GRAPHICAL USER INTERFACE

(71) Applicant: HONOR DEVICE CO., LTD., Shenzhen (CN)

(72) Inventors: Taolin Zhang, Shenzhen (CN); Liwei Huang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/024,912

(22) PCT Filed: Aug. 31, 2022

(86) PCT No.: PCT/CN2022/116343
§ 371 (c)(1),
(2) Date: Mar. 6, 2023

(87) PCT Pub. No.: WO2023/061085
PCT Pub. Date: Apr. 20, 2023

(65) Prior Publication Data
US 2024/0281112 A1    Aug. 22, 2024

(30) Foreign Application Priority Data
Oct. 14, 2021   (CN) .......................... 202111200126.X

(51) Int. Cl.
*G06F 3/04817* (2022.01)
*G06F 3/0485* (2022.01)

(52) U.S. Cl.
CPC ........ *G06F 3/04817* (2013.01); *G06F 3/0485* (2013.01)

(58) Field of Classification Search
CPC ............... G06F 3/04817; G06F 3/0485; G06F 3/04883; G06F 3/04886; G06F 3/0483;
(Continued)

(56) References Cited

U.S. PATENT DOCUMENTS 9,654,598 B1 * 5/2017 Crawford .............. H04W 4/023
10,402,460 B1 9/2019 Jesensky et al.
(Continued)

FOREIGN PATENT DOCUMENTS

CN    106020796 A    10/2016
CN    106354357 A    1/2017
(Continued)

*Primary Examiner* — Daniel W Parcher
(74) *Attorney, Agent, or Firm* — WOMBLE BOND DICKINSON (US) LLP

(57) ABSTRACT

This application provides a card information display method, an electronic device, and a graphical user interface, and relates to the field of terminal technologies. A problem of poor human-computer interaction when a user views push information is resolved. When the electronic device displays the leftmost home screen, a plurality of cards of a same card type may be stacked for display. For example, the plurality of first cards may be stacked and displayed in the first area. Apparently, a stacking manner can reduce display resources occupied by the plurality of first cards. In this way, more other cards may be further displayed on the leftmost home screen, so that utilization of display space is improved.

18 Claims, 35 Drawing Sheets

(58) Field of Classification Search
CPC ............ G06F 3/0481; H04M 1/72448; H04M 2250/22; H04M 1/72403; H04M 1/72427; H04M 1/72451; H04M 1/72454; H04M 1/72457
See application file for complete search history.

(56) References Cited

U.S. PATENT DOCUMENTS

| | | | |
|---|---|---|---|
| 11,036,366 B2* | 6/2021 | Xia | G06F 3/0485 |
| 11,218,842 B2 | 1/2022 | Ding et al. | |
| 2010/0095240 A1* | 4/2010 | Shiplacoff | G06F 3/0481 |
| | | | 345/157 |
| 2014/0059496 A1* | 2/2014 | White | G06F 3/0488 |
| | | | 715/841 |
| 2018/0095611 A1 | 4/2018 | Kuscher et al. | |
| 2019/0342252 A1* | 11/2019 | Dascola | G06F 3/0481 |
| 2020/0257443 A1* | 8/2020 | Huang | G06F 3/04883 |
| 2022/0224665 A1 | 7/2022 | Zhou et al. | |
| 2023/0418444 A1* | 12/2023 | Hu | H04M 1/72469 |

FOREIGN PATENT DOCUMENTS

| | | |
|---|---|---|
| CN | 107995375 A | 5/2018 |
| CN | 110351422 A | 10/2019 |
| CN | 110365721 A | 10/2019 |
| CN | 110389804 A | 10/2019 |
| CN | 111225108 A | 6/2020 |
| CN | 111580905 A | 8/2020 |
| CN | 111625309 A | 9/2020 |
| CN | 306071786 S | 9/2020 |
| CN | 112068744 A | 12/2020 |
| CN | 112612386 A | 4/2021 |
| WO | 2021183690 A1 | 9/2021 |

* cited by examiner

| In a process in which a leftmost home screen is displayed on a mobile phone, the mobile phone may receive a sliding operation 4 for instructing to unfold a card stack |  S101 |

↓

| The mobile phone tiles recommended cards in the card stack in response to the sliding operation 4 |  S102 |

↓

| When display space occupied by the tiled recommended cards is not greater than one screen, the mobile phone may stack a plurality of recommended cards again in response to an operation performed by a user on a hotspot 1 or a hotspot 2 |  S103 |

↓

| When the display space occupied by the tiled recommended cards is greater than one screen, the mobile phone may stack the plurality of recommended cards again in response to a tapping operation performed by the user on a hotspot 4 or a plurality of sliding upward operations performed by the user on a hotspot 3 |  S104 |

FIG. 5

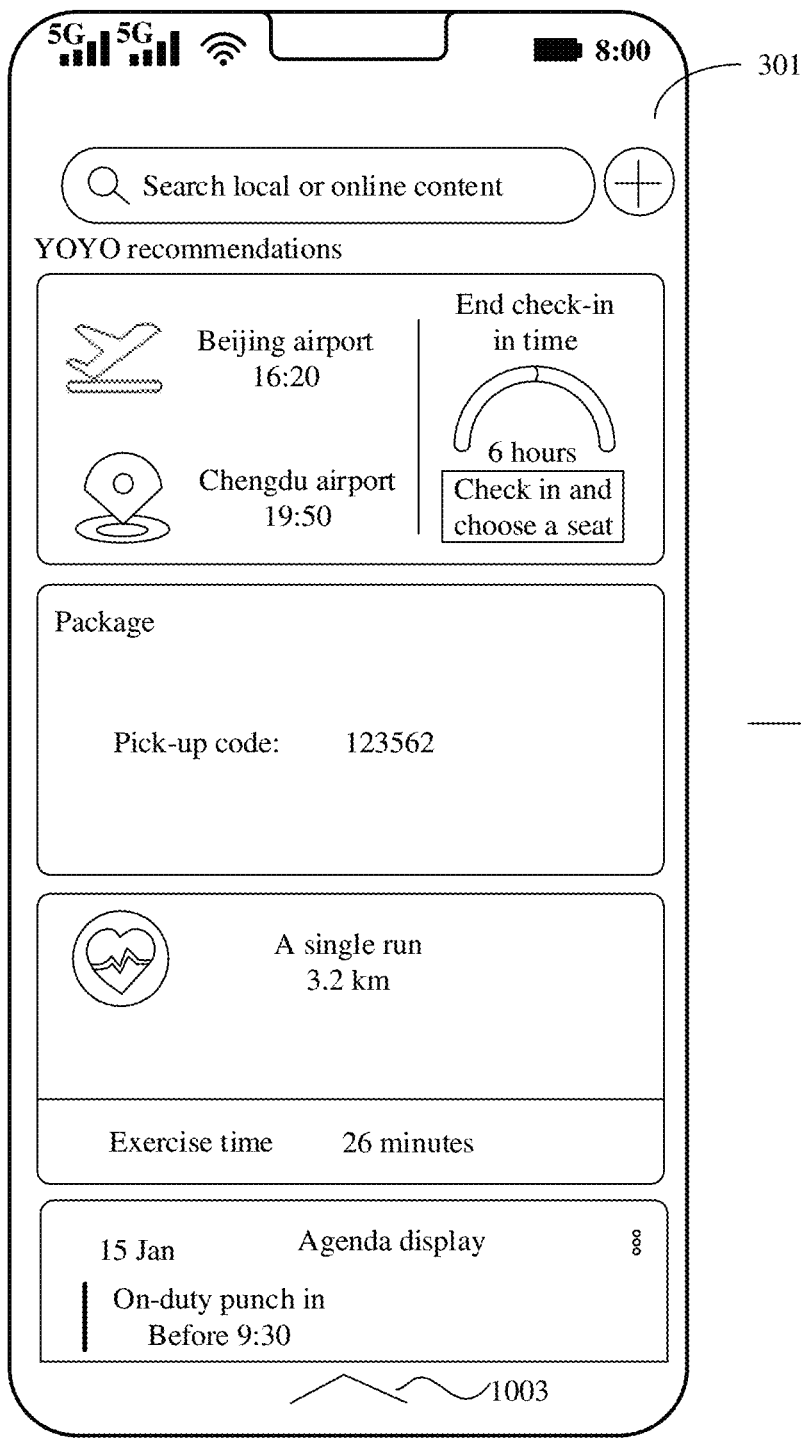
FIG. 10(a)(1)

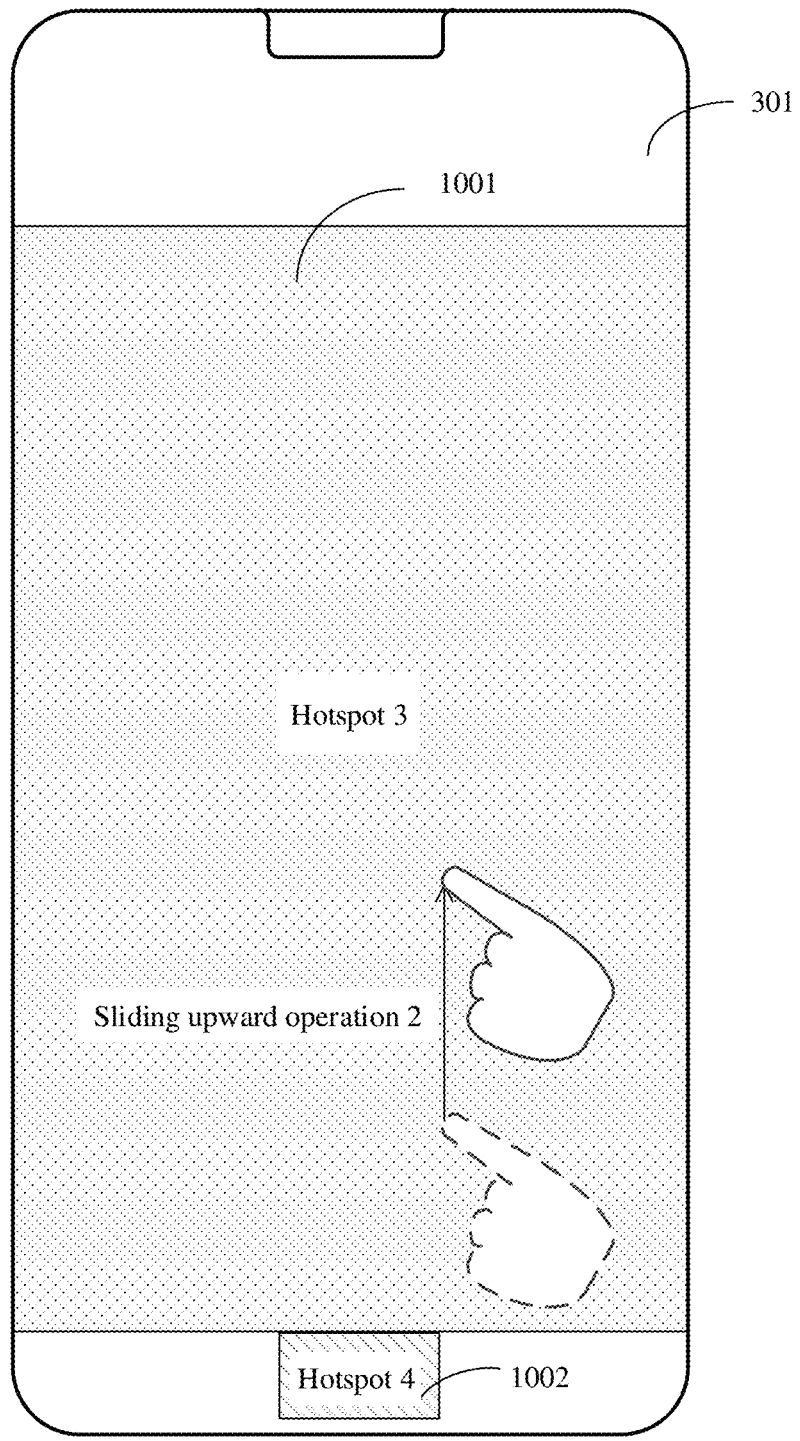
FIG. 10(a)(2)

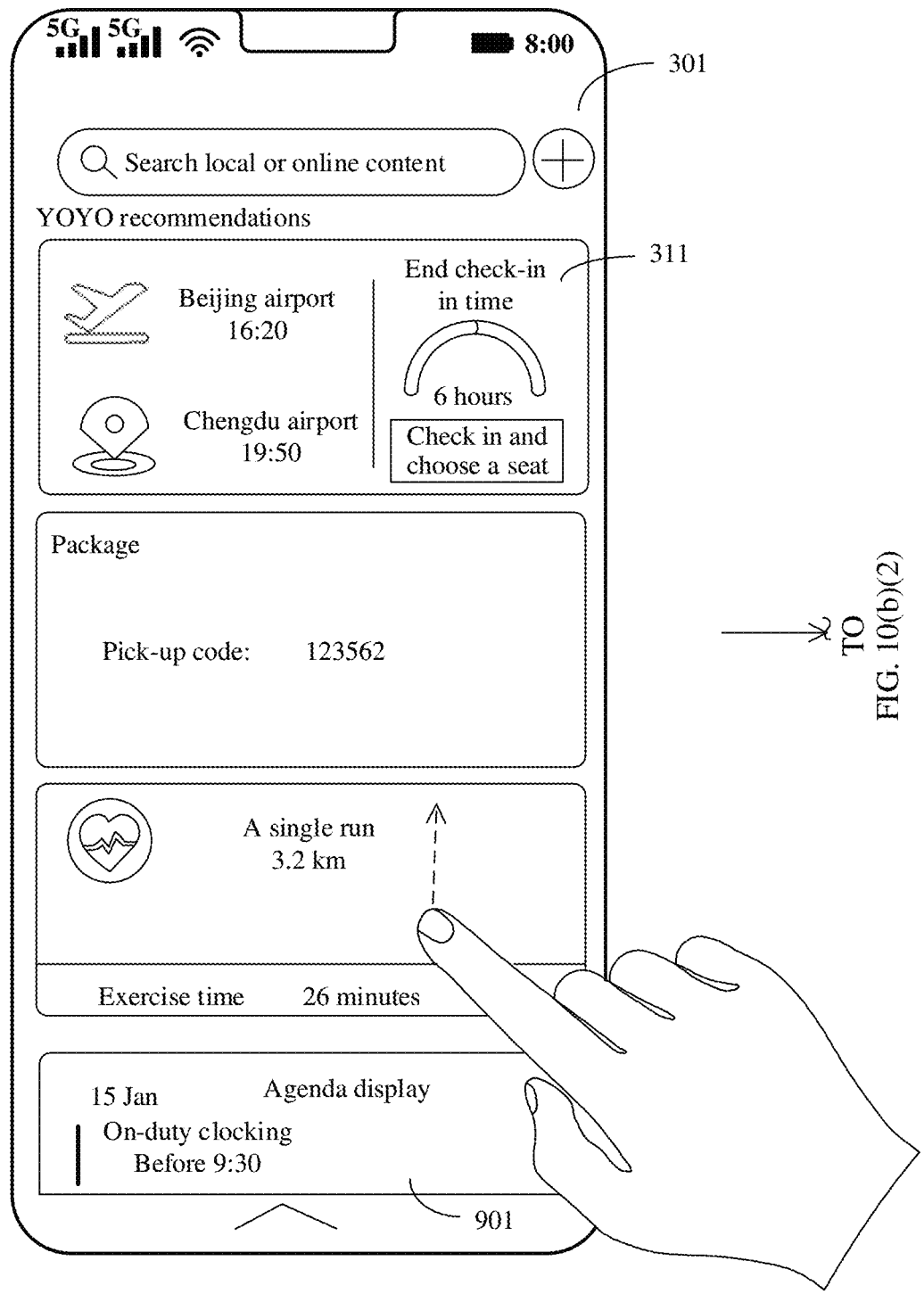
FIG. 10(b)(1)

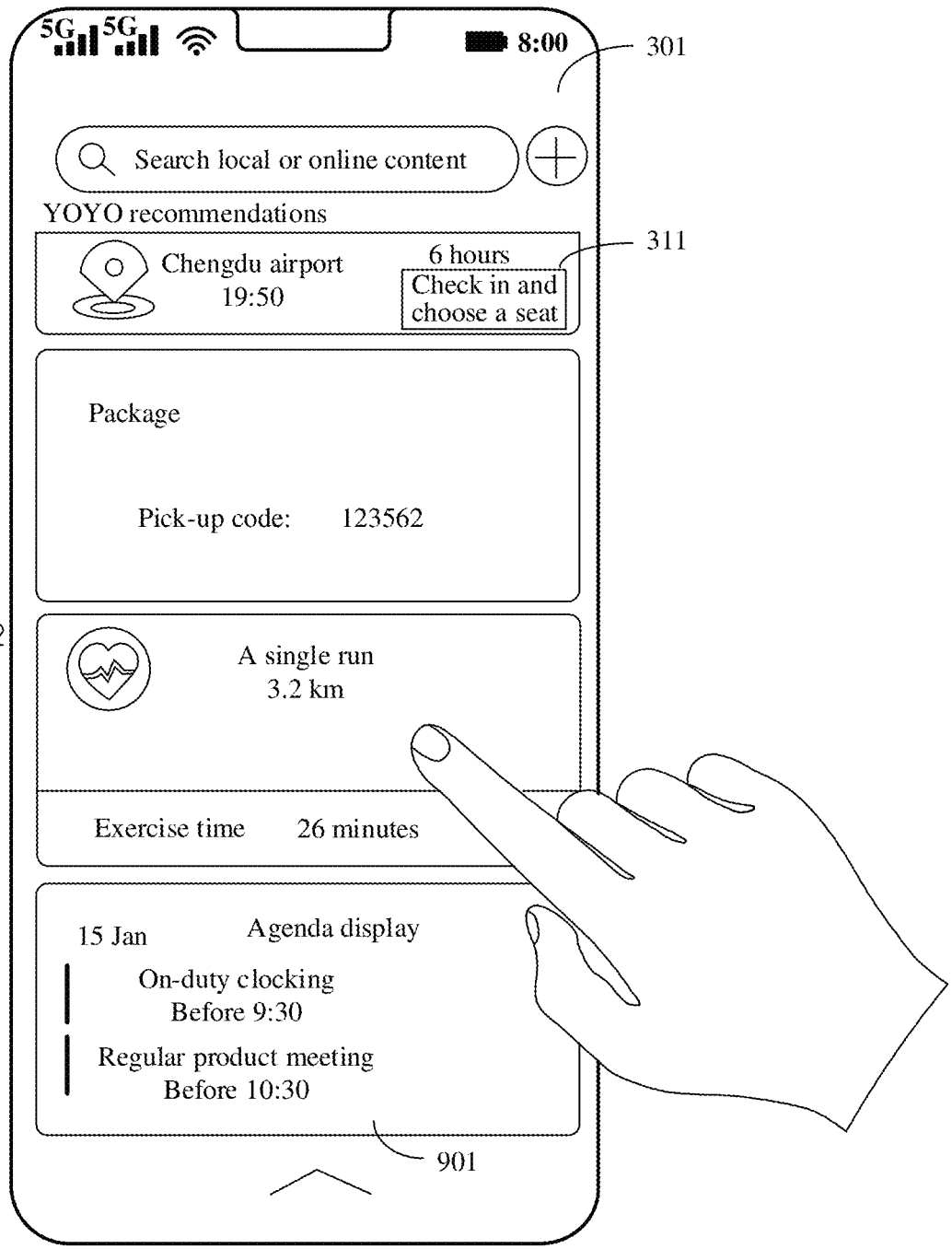
FIG. 10(b)(2)

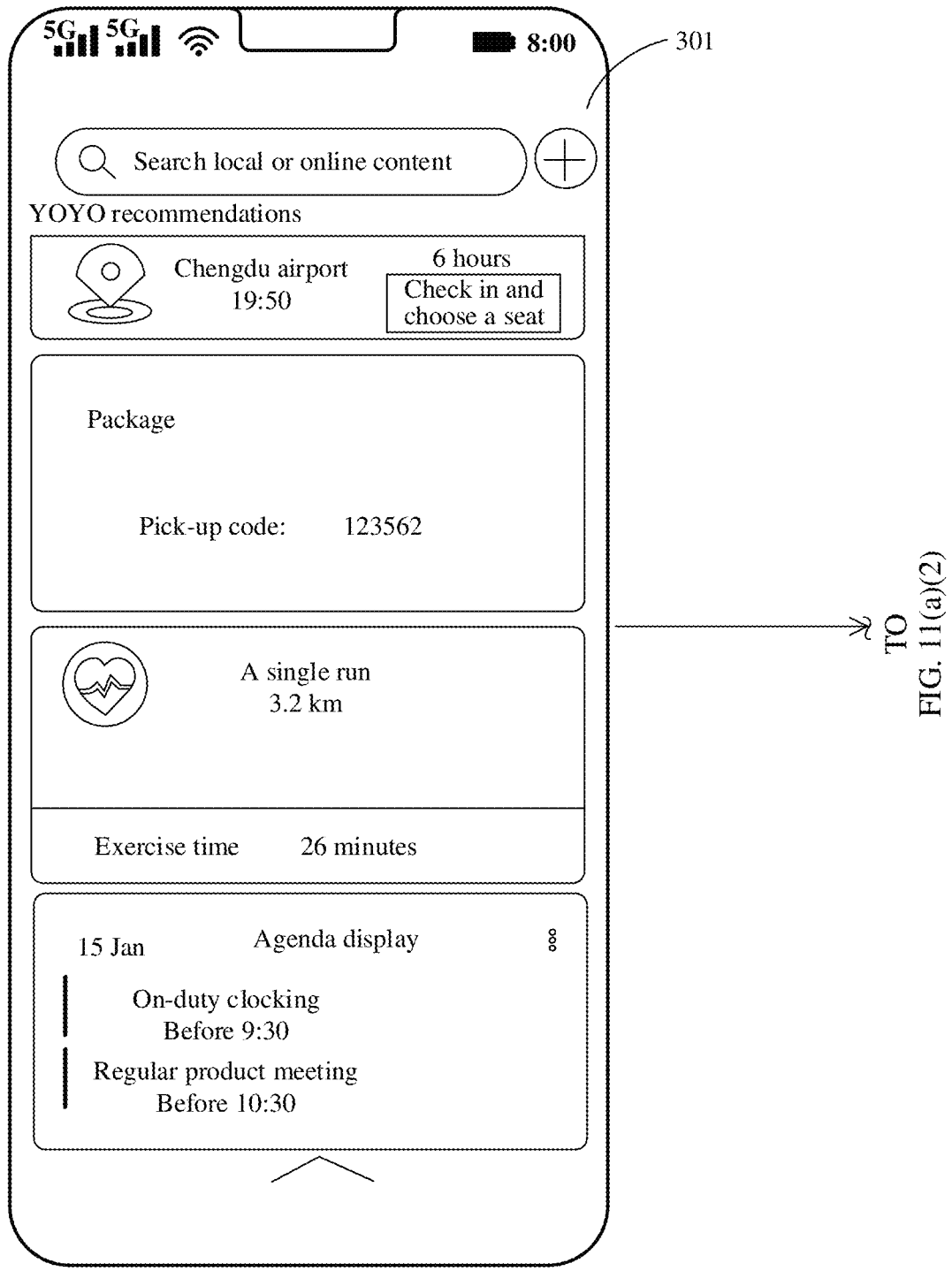
FIG. 11(a)(1)

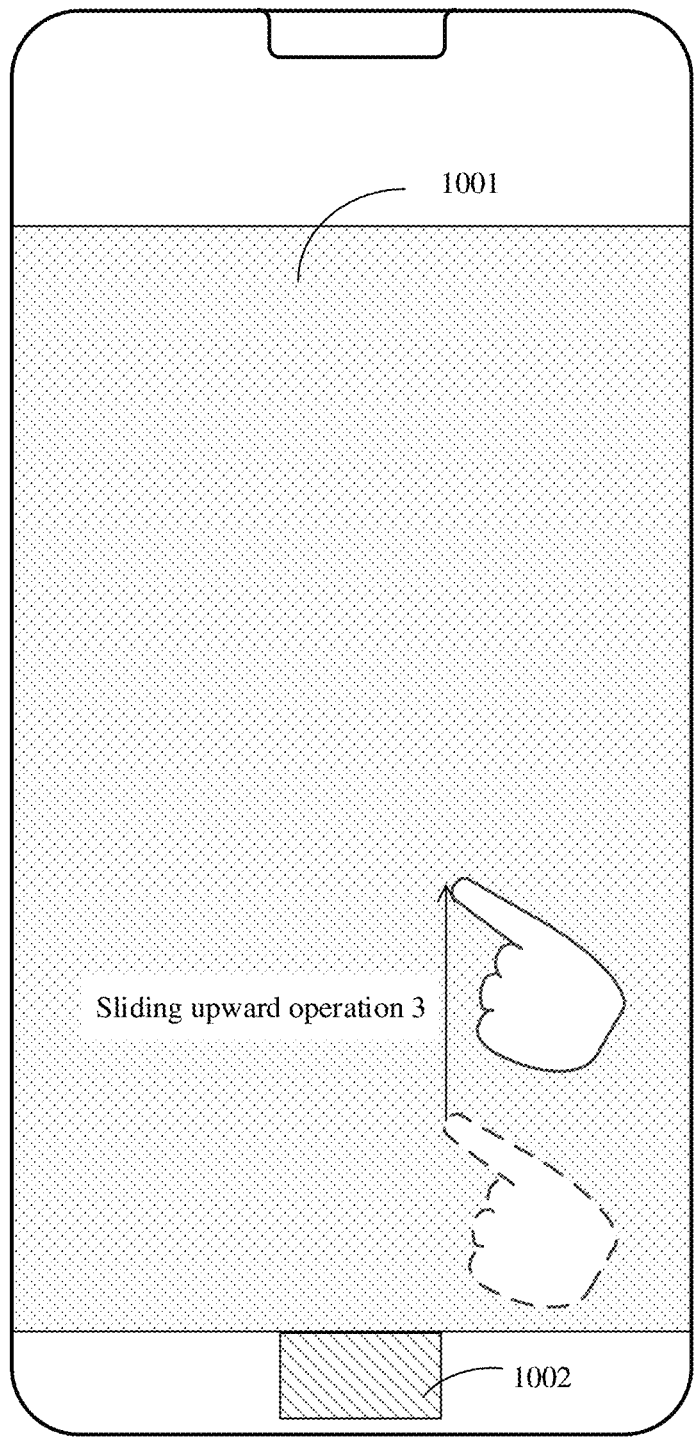
FIG. 11(a)(2)

CARD INFORMATION DISPLAY METHOD, ELECTRONIC DEVICE, AND GRAPHICAL USER INTERFACE

CROSS-REFERENCE TO RELATED APPLICATIONS

This application is a national stage of International Application No. PCT/CN2022/116343, filed on Aug. 31, 2022, which claims priority to Chinese Patent Application No. 202111200126.X, filed on Oct. 14, 2021. The disclosures of both of the aforementioned applications are hereby incorporated by reference in their entireties.

TECHNICAL FIELD

This application relates to the field of terminal technologies, and in particular, to a card information display method, an electronic device, and a graphical user interface.

BACKGROUND

In the information explosion era, information is updated at an increasingly faster speed, and a user has lots of access to information. To quickly obtain required valid information without being disturbed by irrelevant information becomes an urgent need of the user. Currently, an electronic device pushes subscribed push information to the user on a leftmost home screen by using a card, to filter a huge amount of information.

As increasing more push information is subscribed, increasingly more cards are tiled on the leftmost home screen. However, display space of the leftmost home screen is limited, and all cards cannot be displayed at the same time. The user needs to flip through all the cards to avoid missing important push information. Apparently, human-computer interaction efficiency of viewing the push information by the user is very low; and utilization of the display space of the leftmost home screen is also low:

SUMMARY

Embodiments of this application provide a card information display method, an electronic device, and a graphical user interface, to improve utilization of display space while improving efficiency of viewing push information by a user.

To achieve the foregoing objective, the following technical solutions are used in this application.

According to a first aspect, an embodiment of this application provides a card information display method, and the method includes: An electronic device displays a leftmost home screen, where the leftmost home screen includes a first area, and the first area includes a plurality of stacked first cards: the electronic device receives a first operation; and the electronic device displays the plurality of tiled first cards on the leftmost home screen in response to the first operation, where first height of the plurality of first cards does not exceed second height, the first height is total height obtained after the plurality of first cards are tiled, and the second height is a screen display height value of the leftmost home screen; and after displaying the plurality of tiled first cards, the electronic device displays the plurality of stacked first cards in the first area of the leftmost home screen again in response to a first sliding upward operation: or the electronic device displays a first part of the plurality of tiled first cards on the leftmost home screen in response to the first operation, where the first height of the plurality of first cards exceeds the second height: after displaying the first part, the electronic device displays a second part of the plurality of first cards on the leftmost home screen in response to a received second sliding upward operation; and after all the first cards have been displayed on the leftmost home screen, the electronic device displays the plurality of stacked first cards in the first area of the leftmost home screen again in response to a received third sliding upward operation.

In the foregoing embodiment, when the electronic device displays the leftmost home screen, a plurality of cards of a same card type may be stacked for display. For example, the plurality of first cards may be stacked and displayed in the first area. Apparently, a stacking manner can reduce display resources occupied by the plurality of first cards. In this way, more other cards may be further displayed on the leftmost home screen, so that utilization of display space is improved.

In addition, the electronic device may further tile the stacked first cards in response to the first operation of the user, so that the user can quickly obtain information content displayed on the first card without a need to repeatedly flip through the plurality of first cards. In this way, human-computer interaction efficiency of viewing the first card by the user is improved.

In addition, after the plurality of first cards are tiled, the electronic device may further stack the tiled first cards again based on an operation of the user. In this way, viewing other cards or messages on the leftmost home screen by the user is not affected.

In addition, when all the tiled first cards are displayed on the leftmost home screen, the user instructs, by using a simple sliding upward operation, the electronic device to stack the first cards, and this operation is convenient.

When only the first part of the tiled first cards are displayed on the leftmost home screen, a plurality of sliding upward operations of the user may instruct to stack the first cards. In this process, the second part of the tiled first cards may be displayed on the leftmost home screen. In this way, it can be ensured that all the first cards are sequentially displayed on the electronic device, to avoid a problem that display of a card is omitted. After all the tiled first cards have been displayed on the leftmost home screen, the tiled first cards are stacked.

In summary, in the foregoing embodiment, scenarios in which the user flips through all cards without any clue are reduced while utilization of display space is improved, and human-computer interaction efficiency of viewing push information by the user is improved.

In some possible embodiments, the first card is an intelligently recommended card and is used to display first information, the first information is from one or more applications, and the first information includes at least one of time validity information, fence information, or state information.

For example, when the first information is a conference agenda from a calendar application, the first information may correspond to the time validity information, that is, conference start time. For another example, when the first information is flight information from a travel ticket booking application, the first information may also correspond to the time validity information, that is, flight departure time. For another example, when the first information is a package pick-up code from a logistics application, the first information may correspond to the fence information, that is, a geographical fence of a package pick-up station. For another example, when the first information is real-time amount of exercise information from a Sports & Health application, the first information may correspond to the state information, that is, a running state.

Certainly, time validity information, fence information, and state information that are corresponding to different first information are determined based on content carried in the first information and a message type of the first information. For example, the electronic device includes a correspondence between fence information and different geographical names. In this way, the electronic device may extract the geographical name from the first information, to determine fence information of the first information. For another example, the electronic device includes a correspondence fence information and between different message types. In this way, the electronic device may also determine corresponding fence information based on a message type of the first information.

When at least one of the time validity information, the fence information, or the state information of the first information meets the preset condition, the first card is pushed by the electronic device to the first area.

In addition, the leftmost home screen further includes a second area, the second area includes at least one second card, the second card is associated with an application and is used to display second information of the associated application, and the second card is a card configured by the user.

In the foregoing embodiment, at proper time, in proper space, or in a proper state, the electronic device instructs, by using the first card in the first area, the user to check first information from at least one application, to intelligently push push information for different applications. In addition, the electronic device further displays the second information of the associated application to the user in real time by using the second card, so that it is convenient for the user to view subscribed information. In addition, when the first information of the first card is the same as the second information actually displayed in the second area, display of the first card may be canceled. It can be learned that, in a same interface, the user can not only view push information that needs to be currently viewed after evaluation of the electronic device, but also does not need to flip through all second cards. Content of the first card and the second card displayed in a same interface is also different, so that a problem of repeatedly viewing same push information by the user is ameliorated. In this way, human-computer interaction efficiency of viewing the push information by the user is effectively improved.

In some possible embodiments, the second card is arranged under the first card, and before the displaying the plurality of tiled first cards or the displaying a first part of the plurality of tiled first cards, the method further includes: The electronic device controls the plurality of first cards to be tiled; and in a process of tiling the plurality of first cards, the electronic device controls the second card to translate downward until the second card is hidden.

In the foregoing embodiment, before the first card is completely tiled, the electronic device always controls the second card to translate downward vertically until all the plurality of first cards are tiled or the second card disappears from a lower edge of the leftmost home screen, that is, the second card is hidden. In addition, in a process of tiling the first cards, the second card only needs to translate downward, to provide display space for the tiled first cards. In this way, a new interface does not need to be created to display the tiled first cards. Therefore, a problem that a plurality of pages are repeatedly switched does not occur, and user experience is improved. In addition, when a relatively small quantity of first cards are tiled, the second card may still be displayed on the leftmost home screen, to avoid affecting viewing of the second card by the user.

In some possible embodiments, before the displaying the plurality of stacked first cards in the first area again, the method further includes: The electronic device stacks the plurality of first cards based on the first sliding upward operation; and in a process of stacking the plurality of first cards, the electronic device displays the second card on the leftmost home screen, and controls the second card to translate upward until the second card is displayed in the second area again.

In some possible embodiments, before the displaying a second part of the plurality of first cards, the method further includes: The electronic device controls the first card to translate upward based on the second sliding upward operation. After all the first cards have been displayed on the leftmost home screen, the method further includes: The electronic device stacks the plurality of first cards based on the third sliding upward operation; and in a process of stacking the plurality of first cards, the electronic device displays the second card on the leftmost home screen, and controls the second card to translate upward until the second card is displayed in the second area again.

In some possible embodiments, the method further includes: In a period in which the plurality of first cards are stacked and displayed in the first area, the electronic device responds to a received fourth sliding upward operation; and the electronic device controls the first card and the second card to translate upward on the leftmost home screen, and displays the hidden second card.

In some possible embodiments, a manner in which the time validity information of the first information meets the preset condition includes: A time period indicated by the time validity information of the first information includes current system time of the electronic device.

The time validity information may correspond to a time point. For example, conference start time in a conference agenda is 9:00 a.m., and for another example, flight departure time in flight information is 8:00 a.m. The time period indicated by the time validity information may be a time interval that includes the time point. For example, a time period indicated by time validity information of the conference agenda may be between 8:00 a.m. and 9:00 a.m. For another example, a time period indicated by time validity information of the flight information may be between 4:00 a.m. and 8:00 a.m. Lengths of time periods indicated by time validity information of different first information may be different, and lengths of time periods indicated by different time validity information may be preconfigured by the user.

When the system time of the electronic device belongs to the time period indicated by the time validity information, the first information corresponding to the time validity information is information that meets the preset condition. In this way, information is pushed at proper time by using the first card.

In some possible embodiments, a manner in which the fence information of the first information meets the preset condition includes: A geographical area indicated by the fence information of the first information covers a current position of the electronic device.

The fence information may be one or a combination of a geographical fence, a Wi-Fi fence, a BLUETOOTH fence, and the like.

After the electronic device is located in the geographical area indicated by the fence information of the first information, the first information is also information that meets the preset condition. In this way, information is pushed at a proper place by using the first card.

In some possible embodiments, a manner in which the state information of the first information meets the preset condition includes: The state information of the first information is the same as a current state of a user holding the electronic device.

Motion information detected by an acceleration sensor, a gyroscope, or the like of the electronic device may be used to determine the current state of the user holding the electronic device.

After the current state of the user holding the electronic device is the same as the state information of the first information, the first information is also information that meets the preset condition. In this way, information is pushed in a proper user state by using the first card.

In some possible embodiments, the method further includes: The electronic device receives a second operation when the leftmost home screen is displayed: the electronic device displays the editable leftmost home screen in response to the second operation: the electronic device receives a third operation of the user during display of the editable leftmost home screen; and the electronic device adds a new second card to the second area or deletes the second card from the second area in response to the third operation.

In the foregoing embodiment, the electronic device creates the second card based on behavior of the user of subscribing to the application, to ensure that information displayed on the second card is information required by the user. In addition, the electronic device may further delete the second card based on behavior of the user of canceling subscription to the application. In this way, human-computer interaction efficiency of managing the second card by the user is improved.

In some possible embodiments, when the electronic device receives an operation performed by the user on the first card, for example, a tapping operation, a message interface corresponding to the first card may be further displayed. The message interface may be an application interface provided by an application corresponding to the first card, or may be an interface pushed by a message source corresponding to the first card.

After the electronic device displays the message interface corresponding to the first card, the electronic device may determine that the first card has been processed, and may cancel display of the first card.

In some possible embodiments, in a scenario in which there is only one first card in the first area, the electronic device receives a sliding upward operation performed by the user on the first card, and may fold the first card, for example, reduce display space of the first card, and display only a message digest of the first card, such as a message title.

In some possible embodiments, the leftmost home screen further includes a third area, and the third area includes a function entry icon from one or more applications, for example, a scan icon and a payment code icon. The function entry icon may make it convenient for the user to quickly use a corresponding function, for example, enable a code scanning function and a payment function, so that human-computer interaction efficiency of the leftmost home screen is improved.

In some possible embodiments, the leftmost home screen further includes a search bar. When receiving an entering operation of the user in the search bar, the electronic device may search, based on information entered by the user, such as a keyword, for push information or a card associated with the leftmost home screen. For example, if the user enters "motion", the electronic device may search for a second card corresponding to an application "Sports & Health" on the leftmost home screen.

In some possible embodiments, the first area further includes a first identifier, and the first identifier is used to remind the user that the plurality of first cards are stacked in the first area. This can also notify the user whether all the first cards are unfolded.

In some possible embodiments, after the displaying the plurality of tiled first cards or the displaying a first part of the plurality of tiled first cards, the method further includes: The electronic device displays a first control on the leftmost home screen, where the first control is used to instruct to stack the tiled first cards again.

In some possible embodiments, before the displaying the plurality of tiled first cards or the displaying a first part of the plurality of tiled first cards, the method further includes: The electronic device determines the corresponding first height based on a card quantity of the plurality of first cards.

According to a second aspect, an embodiment of this application provides an electronic device. The electronic device includes one or more processors and a memory. The memory is coupled to the processor, the memory is configured to store computer program code, the computer program code includes a computer instruction, and when the one or more processors execute the computer instruction, the one or more processors are configured to:
 display a leftmost home screen, where the leftmost home screen includes a first area, and the first area includes a plurality of stacked first cards;
 receive a first operation; and
 display the plurality of tiled first cards on the leftmost home screen in response to the first operation, where first height of the plurality of first cards does not exceed second height, the first height is total height obtained after the plurality of first cards are tiled, and the second height is a screen display height value of the leftmost home screen; and after the plurality of tiled first cards are displayed, display the plurality of stacked first cards in the first area of the leftmost home screen again in response to a first sliding upward operation: or
 display a first part of the plurality of tiled first cards on the leftmost home screen in response to the first operation, where the first height of the plurality of first cards exceeds the second height; after the first part is displayed, display a second part of the plurality of first cards on the leftmost home screen in response to a received second sliding upward operation; and after all the first cards have been displayed on the leftmost home screen, display the plurality of stacked first cards in the first area of the leftmost home screen again in response to a received third sliding upward operation.

In some possible embodiments, the first card is an intelligently recommended card and is used to display first information, the first information is from one or more applications, the first information includes at least one of time validity information, fence information, or state information, and when at least one of the time validity information, the fence information, or the state information in the first information meets a preset condition, the first card is pushed to the first area by the electronic device; and
 the leftmost home screen further includes a second area, the second area includes at least one second card, the second card is associated with an application and is used to display second information of the associated application, and the second card is a card configured by a user.

In some possible embodiments, the second card is arranged under the first card, and before displaying the plurality of tiled first cards or displaying the first part of the plurality of tiled first cards, the one or more processors are further configured to:
control the plurality of first cards to be tiled; and
in a process of tiling the plurality of first cards, control the second card to translate downward until the second card is hidden.

In some possible embodiments, before the displaying the plurality of stacked first cards in the first area again, the one or more processors are further configured to:
stack the plurality of first cards based on the first sliding upward operation; and
in a process of stacking the plurality of first cards, display the second card on the leftmost home screen, and control the second card to translate upward until the second card is displayed in the second area again.

In some possible embodiments, before displaying the second part of the plurality of first cards, the one or more processors are further configured to control, based on the second sliding upward operation, the first card to translate upward; and
after all the first cards have been displayed on the leftmost home screen, the one or more processors are further configured to: stack the plurality of first cards based on the third sliding upward operation; and
in a process of stacking the plurality of first cards, display the second card on the leftmost home screen, and control the second card to translate upward until the second card is displayed in the second area again.

In some possible embodiments, the one or more processors are further configured to:
in a period in which the plurality of first cards are stacked and displayed in the first area, respond to a received fourth sliding upward operation; and
control the first card and the second card to translate upward on the leftmost home screen, and display the hidden second card.

In some possible embodiments, a manner in which the time validity information of the first information meets the preset condition includes: a time period indicated by the time validity information of the first information includes current system time of the electronic device:
a manner in which the fence information of the first information meets the preset condition includes: a geographic area indicated by the fence information of the first information includes a current position of the electronic device; and
a manner in which the state information of the first information meets the preset condition includes: the state information of the first information is the same as a current state of a user holding the electronic device.

In some possible embodiments, the one or more processors are further configured to: receive a second operation when the leftmost home screen is displayed;
display the editable leftmost home screen in response to the second operation;
receive a third operation of the user during display of the editable leftmost home screen; and
add a new second card to the second area or delete the second card from the second area in response to the third operation.

In some possible embodiments, the leftmost home screen further includes a third area, and the third area includes a function entry icon from one or more applications.

In some possible embodiments, the first area further includes a first identifier, and the first identifier is used to remind the user that the plurality of first cards are stacked in the first area.

In some possible embodiments, after displaying the plurality of tiled first cards or displaying the first part of the plurality of tiled first cards, the one or more processors are further configured to:
display a first control on the leftmost home screen, where the first control is used to instruct to stack the tiled first cards again.

In some possible embodiments, before displaying the plurality of tiled first cards or displaying the first part of the plurality of tiled first cards, the one or more processors are further configured to determine the corresponding first height based on a card quantity of the plurality of first cards.

According to a third aspect, an embodiment of this application provides a graphical user interface on an electronic device, and the electronic device has a display screen, a memory, and one or more processors that execute one or more instructions stored in the memory. A leftmost home screen is displayed in response to detection of a fourth operation, where the leftmost home screen includes a first area, and the first area includes a plurality of stacked first cards: the plurality of tiled first cards are displayed on the leftmost home screen in response to a received first operation, where first height of the plurality of first cards does not exceed second height, the first height is total height obtained after the plurality of first cards are tiled, and the second height is a screen display height value of the leftmost home screen; and the plurality of stacked first cards are displayed in the first area again in response to a received first sliding upward operation; or a first part of the plurality of tiled first cards are displayed on the leftmost home screen in response to the received first operation, where the first height of the plurality of first cards exceeds the second height: a second part of the plurality of first cards are displayed on the leftmost home screen in response to a received second sliding upward operation; and the plurality of stacked first cards are displayed in the first area again in response to a received third sliding upward operation after all the first cards have been displayed on the leftmost home screen.

According to a fourth aspect, an embodiment of this application provides a computer storage medium, including computer instructions. When the computer instructions are run on an electronic device, the electronic device is enabled to perform the method in the first aspect and the possible embodiments of the first aspect.

According to a fifth aspect, this application provides a computer program product. When the computer program product is run on the foregoing electronic device, the electronic device is enabled to perform the method in the first aspect and the possible embodiments of the first aspect.

It may be understood that the electronic device, the graphical user interface, the computer-readable storage medium, and the computer program product provided in the foregoing aspects are all applied to the corresponding method provided above. Therefore, for beneficial effects that can be achieved by the electronic device, the graphical user interface, the computer-readable storage medium, and the computer program product, refer to beneficial effects in the corresponding method provided above. Details are not described herein again.

BRIEF DESCRIPTION OF DRAWINGS

FIG. 5 is a step flowchart of a card information display method according to an embodiment of this application:

FIG. 10(a)(1), FIG. 10(a)(2), FIG. 10(b)(1), and FIG. 10(b)(2) are an example diagram 6 of display of a mobile phone according to an embodiment of this application:

DESCRIPTION OF EMBODIMENTS

In the following descriptions, terms "first" and "second" are merely used for description, and cannot be understood as an indication or implication of relative importance, or an implicit indication of a quantity of indicated technical features. Therefore, features defined by "first" and "second" may explicitly or implicitly include one or more of the features. In the descriptions of the embodiments, unless otherwise stated, "a plurality of" means two or more.

Implementations of the embodiments are described in detail below with reference to the accompanying drawings.

An embodiment of this application provides a card information display method, and the card information display method may be applied to an electronic device with a display screen. A plurality of pieces of stacked card information (or may be referred to as a card for short) may be displayed on the display screen. In this way, display space required by the plurality of cards is the same as display space required by one card, so that display space can be effectively saved. In addition, the electronic device may further tile the stacked cards based on an operation of a user, so that the user can conveniently view the cards. When all the cards are tiled, the electronic device may further stack the tiled cards again based on an operation of the user. In this way, not only display space of the electronic device is saved, but human-computer interaction efficiency of viewing information by the user can also be improved.

In addition, the electronic device may be a device with a display screen, such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

Figure 1:
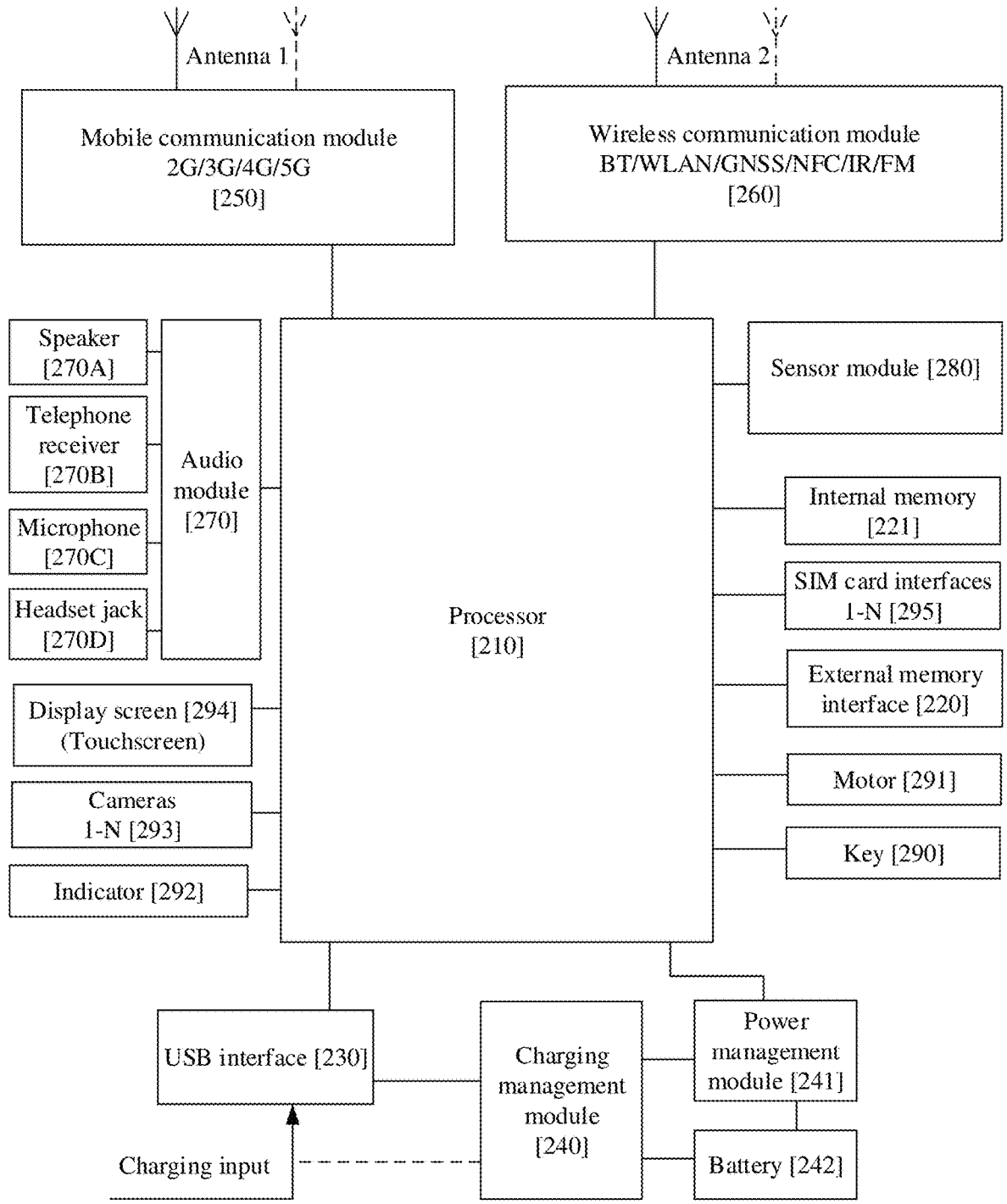
FIG. 1 is a schematic diagram of a hardware architecture of a terminal device according to an embodiment of this application.

For example, FIG. 1 is a schematic diagram of a structure of an electronic device according to an embodiment of this application. As shown in FIG. 1, the electronic device (such as a mobile phone) may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a telephone receiver 270B, a microphone 270C, a headset jack 270D, a sensor module 280, a key 290, a motor 291, an indicator 292, a camera 293, a display screen 294, a subscriber identity module (subscriber identification module, SIM) card interface 295, and the like.

The sensor module 280 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It may be understood that the structure shown in this embodiment does not specifically limit the electronic device. In other embodiments, the electronic device may include more or fewer components than those shown in the figure, or combine some components, or split some components, or have different component arrangements. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit. GPU), an image signal processor (image signal processor, ISP), a controller, a memory, a video codec, a digital signal processor (digital signal processor, DSP), a baseband processor, and/or a neural network processing unit (neural-network processing unit, NPU). Different processing units may be independent components, or may be integrated into one or more processors.

The controller may be a neural center and a command center of the electronic device. The controller may generate an operation control signal based on instruction operation code and a time sequence signal, to control a fetch instruction and an execute instruction.

A memory may be further disposed in the processor 210, and is configured to store instructions and data. In some embodiments, the memory in the processor 210 is a cache. The memory may store an instruction or data that has been recently used or cyclically used by the processor 210. If the processor 210 needs to use the instruction or the data again, the processor 210 may directly invoke the instruction or the data from the memory. Repeated access is avoided, and waiting time of the processor 210 is reduced, and therefore system efficiency is improved.

In some embodiments, the processor 210 may include one or more interfaces. The interface may include an inter-integrated circuit (inter-integrated circuit. 12C) interface, an inter-integrated circuit sound (inter-integrated circuit sound. 12S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output. GPIO) interface, a subscriber identity module (subscriber identity module. SIM) interface, a universal serial bus (universal serial bus. USB) interface, and/or the like.

It may be understood that, an interface connection relationship between modules shown in this embodiment is merely a schematic description, and does not limit a structure of the electronic device. In other embodiments, the electronic device may alternatively use an interface connection manner different from that in the foregoing embodiment, or use a combination of a plurality of interface connection manners.

The charging management module 240 is configured to receive charging input from the charger. The charger may be a wireless charger, or may be a wired charger. When charging the battery 242, the charging management module 240 may further supply power to the electronic device by using the power management module 241.

The power management module 241 is configured to connect the battery 242 and the charging management module 240 to the processor 210. The power management module 241 receives input of the battery 242 and/or the charging management module 240, and supplies power to the processor 210, the internal memory 221, an external memory, the display screen 294, the camera 293, the wireless communication module 260, and the like. In some embodiments, the power management module 241 and the charging management module 240) may alternatively be disposed in a same component.

A wireless communication function of the electronic device may be implemented by using the antenna 1, the antenna 2, the mobile communication module 250, the wireless communication module 260, the modem processor, the baseband processor, and the like. In some embodiments, in the electronic device, the antenna 1 and the mobile communication module 250) are coupled, and the antenna 2 and the wireless communication module 260 are coupled, so that the electronic device may communicate with a network and another device such as a wearable device by using a wireless communication technology.

The antenna 1 and the antenna 2 are configured to transmit and receive an electromagnetic wave signal. Each antenna in the electronic device may be configured to cover a single communication frequency band or a plurality of communication frequency bands. Different antennas may be further multiplexed to improve antenna utilization. For example, the antenna 1 may be multiplexed as a diversity antenna of a wireless local area network. In other embodiments, the antenna may be used in combination with a tuning switch.

The mobile communication module 250) may provide a solution for wireless communication including 2G/3G/4G/5G and the like applied to the electronic device. The mobile communication module 250 may include at least one filter, a switch, a power amplifier, a low noise amplifier (low noise amplifier, LNA), and the like. The mobile communication module 250) may receive an electromagnetic wave by using the antenna 1, perform processing such as filtering and amplification on the received electromagnetic wave, and transmit the electromagnetic wave to the modem processor for demodulation.

The mobile communication module 250 may further amplify a signal modulated by the modem processor, convert the signal into an electromagnetic wave by using the antenna 1, and radiate the electromagnetic wave. In some embodiments, at least some function modules of the mobile communication module 250) may be disposed in the processor 210. In some embodiments, at least some function modules of the mobile communication module 250) and at least some modules of the processor 210 may be disposed in a same component.

The wireless communication module 260 may provide a solution for wireless communication including a WLAN (such as a (wireless fidelity, Wi-Fi) network), (BLUETOOTH, a global navigation satellite system (global navigation satellite system, GNSS), frequency modulation (frequency modulation, FM), a near field communication (near field communication, NFC) technology, an infrared (infrared, IR) technology, and the like applied to the electronic device.

The GNSS may include a BeiDou navigation satellite system (beidou navigation satellite system. BDS), a global positioning system (global positioning system, GPS), a global navigation satellite system (global navigation satellite system. GLONASS), a quasi-zenith satellite system (quasi-zenith satellite system, QZSS), and/or a satellite-based augmentation system (satellite based augmentation systems, SBAS).

The wireless communication module 260 may be one or more components integrated with at least one communication processing module. The wireless communication module 260 receives an electromagnetic wave by using the antenna 2, performs frequency modulation and filtering processing on an electromagnetic wave signal, and sends a processed signal to the processor 210. The wireless communication module 260 may further receive a to-be-sent signal from the processor 210, perform frequency modulation and amplification on the signal, convert the signal into an electromagnetic wave by using the antenna 2, and radiate the electromagnetic wave.

The electronic device implements a display function by using the GPU, the display screen 294, the application processor, and the like. The GPU is a microprocessor for image processing, and is connected to the display screen 294 and the application processor. The GPU is configured to perform mathematical and geometric calculation, and is used for graphics rendering. The processor 210 may include one or more GPUs that execute program instructions to generate or change display information.

The display screen 294 is configured to display an image, a video, and the like. The display screen 294 includes a display panel.

The electronic device may implement a photographing function by using the ISP, the camera 293, the video codec, the GPU, the display screen 294, the application processor, and the like. The ISP is configured to process data fed back by the camera 293. The camera 293 is configured to capture a static image or a video. In some embodiments, the electronic device may include one or N cameras 293, where N is a positive integer greater than 1.

The external memory interface 220 may be configured to connect to an external storage card such as a micro SD card, to extend a storage capability of the electronic device. The external storage card communicates with the processor 210 by using the external memory interface 220, to implement a data storage function. For example, files such as music and a video are stored in the external storage card.

The internal memory 221 may be configured to store computer-executable program code, and the executable program code includes instructions. The processor 210 performs various functional applications and data processing of the electronic device by running the instructions stored in the internal memory 221. For example, in this embodiment of this application, the processor 210 may execute the instructions stored in the internal memory 221, and the internal memory 221 may include a program storage area and a data storage area.

The program storage area may store an operating system, an application program required by at least one function (such as a sound playing function and an image playing function), and the like. The data storage area may store data (such as audio data and a phone book) and the like created during use of the electronic device. In addition, the internal memory 221 may include a high-speed random access memory, and may further include a non-volatile memory such as at least one magnetic disk storage component, a flash memory component, or a universal flash storage (universal flash storage, UFS).

It may be understood that the structure shown in this embodiment of this application does not constitute a specific limitation on the electronic device. In other embodiments of this application, the electronic device may include more or fewer components than those shown in the figure, or combine some components, or split some components, or have different component arrangements. The components shown in the figure may be implemented by hardware, software, or a combination of software and hardware.

For clarity and brevity of the following embodiments, related concepts or technologies are briefly described first.

Currently, a leftmost home screen is disposed in the electronic device. It may be understood that the leftmost home screen may be a leftmost screen of the electronic device, and is used to provide functions such as searching, application suggestion, a quick service, and an intelligent scenario for a user.

Apparently, the leftmost home screen may be used to display information that needs to be pushed to the user, for example, an application message subscribed by the user or a real-time trending message. On the leftmost home screen, the foregoing information is usually presented in a form of a card. The card has a prominent appearance, and can notify the user to pay attention to the information displayed on the card.

Figure 2A:
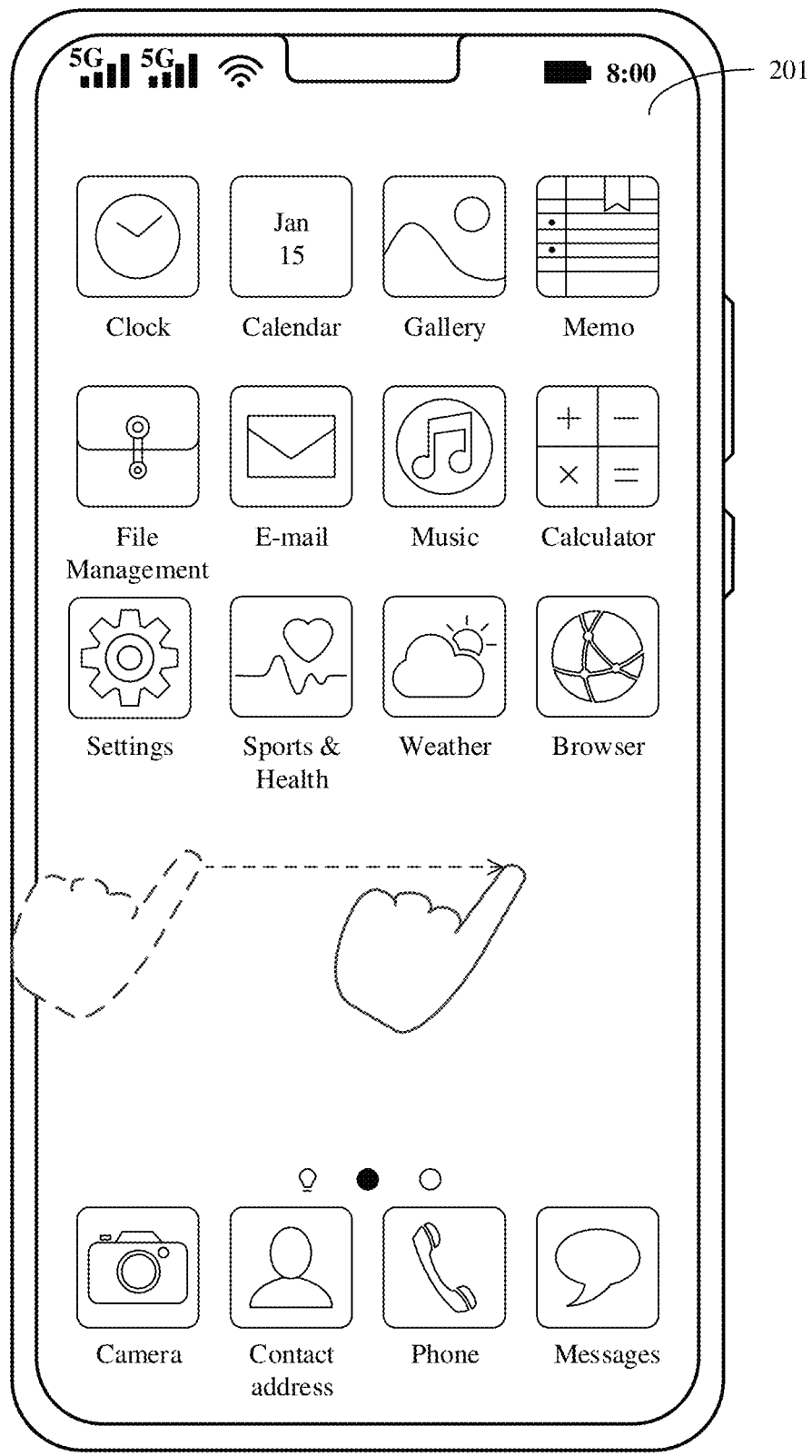
FIG. 2(a) and FIG. 2(b) are an example diagram of a leftmost home screen in some embodiments.
Figure 2B:
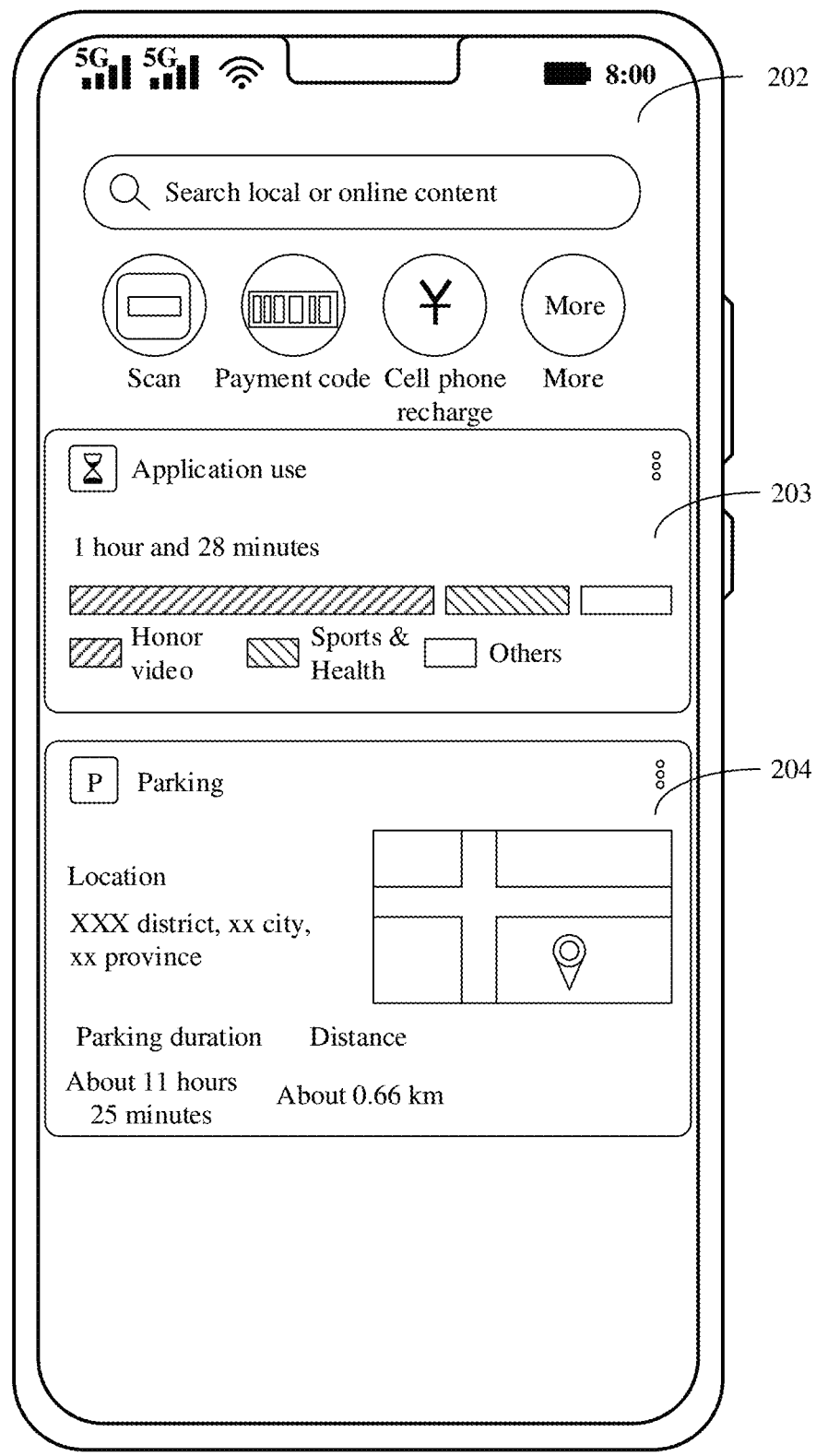

In some examples, when the electronic device receives an operation of the user for instructing to display the leftmost home screen, such as a fourth operation, for example, when a desktop 201 shown in FIG. 2(a) receives a sliding rightward operation, a leftmost home screen 202 shown in in FIG. 2(b) may be displayed.

As shown in FIG. 2(b), the leftmost home screen 202 includes some quick service functions, such as a quick entry (payment code, scan, or the like) of a page of an application.

In addition, the leftmost home screen 202 further includes a plurality of subscribed cards used to display push information published by a subscribed information source. For example, the leftmost home screen 202 includes a card 203 and a card 204. The card 203 and the card 204 may correspond to different information sources, and content displayed on the card 203 and the card 204 is also different.

As shown in FIG. 2(b), the card 203 is used to display an application use message, and the application use message is a system message subscribed by the user. In addition, the card 203 further corresponds to a system interface that includes application use information. When the user taps the card 203, the electronic device may display the system interface.

Still as shown in FIG. 2(b), the card 204 is used to display a parking message, and the parking message is from a message server of a parking APP. In addition, the card 204 further corresponds to an application interface in the parking APP. When the user taps the card 204, the electronic device may display the application interface.

In addition, when the information source publishes a new push message, a corresponding subscribed card also updates displayed content. In this way, subscribed cards on the leftmost home screen 202 need to be tiled. However, a quick service function is fixedly displayed on the leftmost home screen 201. Therefore, an area that can be used to display the subscribed card on the leftmost home screen 202 is limited.

In this way, when the user configures a small quantity of cards, in a case shown in FIG. 2(b), the user can quickly view all subscribed information on the leftmost home screen 202. When there are a large quantity of cards, display space required for tiled layout is greatly affected, and some subscribed cards are hidden.

In addition, regardless of whether the subscribed card is directly displayed on the leftmost home screen 202, content displayed on the subscribed card is continuously updated. The user cannot predict a specific subscribed card on which information that needs to be urgently viewed is displayed. Therefore, after the mobile phone displays the leftmost home screen 202, the user needs to flip through all subscribed cards. Consequently, human-computer interaction efficiency of the mobile phone is reduced.

To ameliorate the foregoing problem, an embodiment of this application provides a card information display method, and an electronic device may dynamically determine a resident service area, a function quick entry area, and a recommendation area on a leftmost home screen.

The recommendation area includes a system-level card that is referred to as a recommended card, that is, a first card. The recommended card is an intelligently recommended card. For example, the recommended card may be a card created when there is push information that meets a preset condition in the electronic device. In addition, the push information that meets the preset condition may be information that needs to be viewed by the user in a current scenario and that is selected by the electronic device from push information provided by all information sources.

For example, the selected push information may be push information with a high degree of urgency in the current scenario, for example, a conference agenda for which conference time has arrived. For another example, the selected push information may alternatively be push information associated with the current scenario. For example, if the current scenario is a package pick-up station, the associated push information is a package pick-up code. For another example, the selected push information may alternatively be push information with a high degree of importance, for example, an agenda marked with a high degree of importance in a current time period by the user.

In some examples, the recommended card may be an interactive card. When push information of an application 1 is displayed on the recommended card, the recommended card may provide a startup interface for starting the application 1. In this way, when receiving an operation performed by the user on the recommended card, the electronic device may display an application interface in the application 1.

In addition, when the electronic device evaluates that content displayed on the recommended card does not need to be viewed by the user, the electronic device may also cancel display of the recommended card or hide display of the recommended card. For example, when an operation performed by the user on the recommended card is received or a real-time scenario does not match push information of the recommended card, display of the recommended card may be canceled or display of the recommended card may be hidden. Certainly, after a new recommended card appears, the new recommended card may replace an original recommended card and is displayed on the top of the recommendation area.

The resident service area includes a plurality of application-level cards that are also referred to as service cards, that is, second cards. The service card is a card created by the electronic device in response to an operation of the user for subscribing to an application. There is an association between the service card and a subscribed application. The application associated with the service card may also be referred to as an associated application. In addition, the service card may be used to display second information pushed by the associated application.

In some examples, the service card may be used to display push information provided by an information source of the associated application. When the information source of the associated application releases new push information, display content on a corresponding service card is also updated. In other examples, the service card may also provide a startup interface for the associated application. In other words, the user may trigger, by tapping the service card, the electronic device to display an application interface provided by the associated application. In addition, a difference from the recommended card is that the service card is always displayed in the resident service area.

It can be learned that in this embodiment of this application, for information subscribed by the user and information required by the user after evaluation of the electronic device, cards of different levels may be displayed on a same interface. In this way, the complete information subscribed by the user can be displayed, and flipping through all cards by the user to check whether there is push information that needs to be urgently processed can be reduced, so that human-computer interaction efficiency when the user views the push information is improved.

Figure 3:
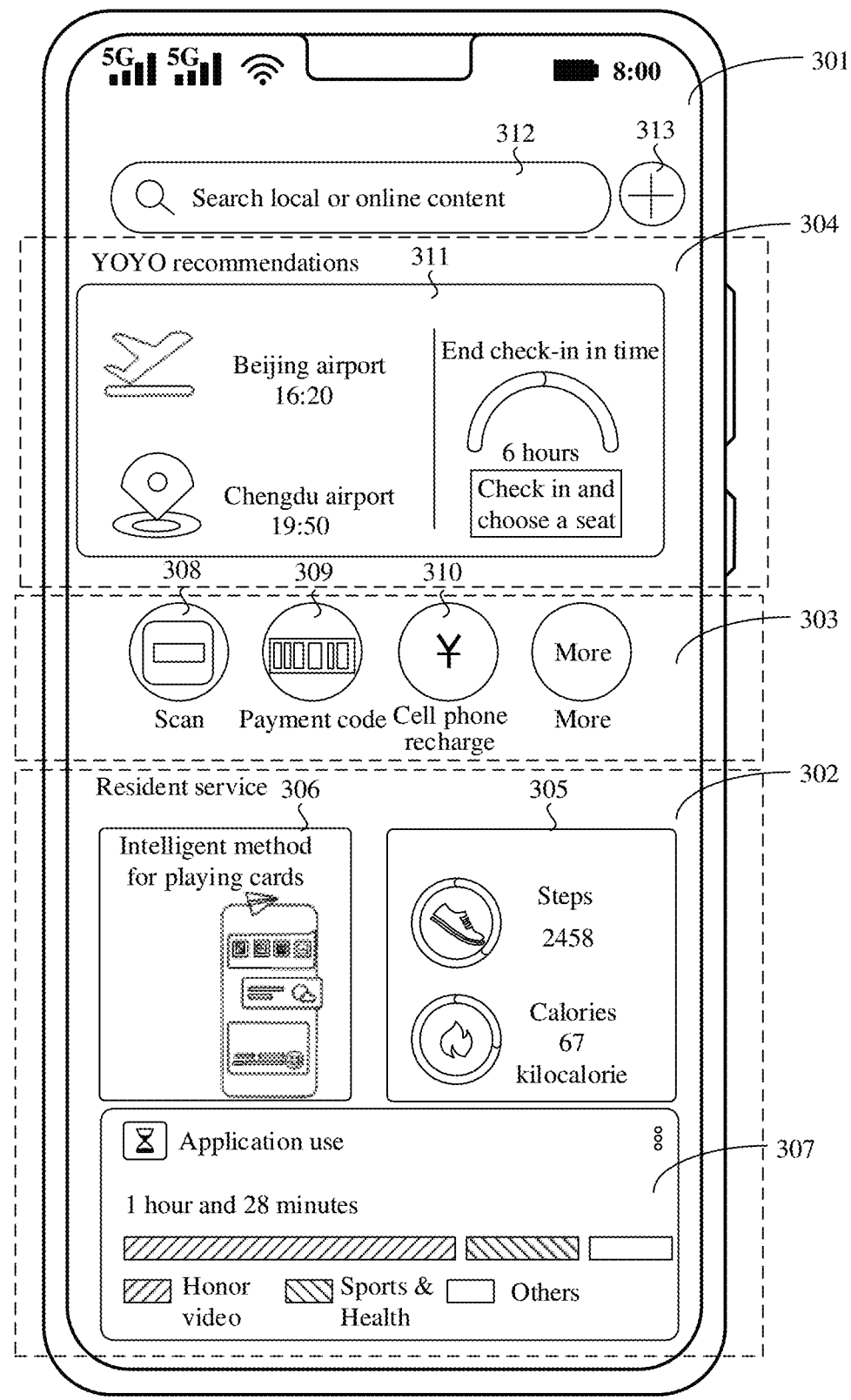
FIG. 3 is an example diagram of a leftmost home screen according to an embodiment of this application.

A mobile phone shown in FIG. 3 is used as an example. As shown in FIG. 3, a leftmost home screen 301 of the mobile phone includes a resident service area 302, a quick entry area 303, and a recommendation area 304.

In some embodiments, a service card 305, a service card 306, and a service card 307 are displayed in the resident service area 302. The service card 305, the service card 306, and the service card 307 are all subscribed cards, and are respectively in a one-to-one correspondence with a Sports & Health APP, a smart card APP, and an application management APP that are subscribed by the user. The service card 305 is used to display push information corresponding to the Sports & Health APP, the service card 306 is used to display push information corresponding to the smart card APP, and the service card 307 is used to display push information corresponding to the application management APP. When push information corresponding to an application is updated, content displayed on the service card is also updated. Although content of the service card changes, the service card may always be retained in the resident service area 302. Certainly, when the user cancels subscription to information about the application corresponding to the service card, display of the service card may be canceled in the resident service area 302.

When the mobile phone receives an operation performed by the user on the service card 305, such as a tapping operation, the mobile phone may display an application interface of the Sports & Health APP. When the mobile phone receives an operation performed by the user on the service card 306, such as a tapping operation, the mobile phone may display an application interface of the smart card APP. When the mobile phone receives an operation performed by the user on the service card 307, such as a tapping operation, the mobile phone may display an application interface of the application management APP.

In addition, the service card may be a card manually configured by the user.

For example, the mobile phone may receive, on the leftmost home screen, an operation (for example, referred to as a second operation) used by the user to instruct to edit the service card, for example, touch and hold a blank area on the leftmost home screen, or tap a control indicating edition on the leftmost home screen, such as a control 313. Then, the mobile phone may display the leftmost home screen in an editable state in response to the operation. On the editable leftmost home screen, only the service card in the resident service area can be adjusted.

The editable leftmost home screen includes a control used to instruct to add a service card and a control used to indicate completion. When the mobile phone receives an operation performed by the user on the control indicating completion, such as a tapping operation, the editable state of the leftmost home screen is canceled.

In some embodiments, a configuration window is displayed when the mobile phone detects that the user operates the control used to instruct to add a service card, such as a tapping operation. Applications to which a service card can be added, such as an application 1, are listed in the configuration window:

In addition, when the mobile phone receives an operation performed by the user on the application 1 in the configuration window, the mobile phone determines that the user instructs to subscribe to the application 1, and creates a corresponding service card, to display information pushed by the application 1. It may be understood that, on the editable leftmost home screen, an operation of adding a new service card may be referred to as a third operation.

In addition, on the editable leftmost home screen, a delete control is displayed for each service card. When the mobile phone receives an operation performed by the user on a delete control corresponding to a service card 1, the mobile phone deletes the service card 1. In this way, display of the service card 1 is also canceled in the resident service area. It may be understood that, on the editable leftmost home screen, an operation of deleting a new service card may also be referred to as the third operation.

In other words, push information of an application subscribed by the user is displayed on the leftmost home screen 301 of the mobile phone in a long-term stable manner by using the resident service area 302.

In some embodiments, the function quick entry area 303 may include at least one function entry icon, such as an icon 308, an icon 309, and an icon 310. The function entry icon corresponds to a specified function of an application. A corresponding function can be enabled when the mobile phone receives an operation for the function entry icon. For example, when an operation on the icon 308 is received, a scanning function may be enabled.

In addition, as shown in FIG. 3, the leftmost home screen 301 further includes a search bar 312. The search bar 312 may be used to search for relevant push information or a relevant function entry based on a keyword entered by the user.

In some embodiments, a card 311 may be displayed in the recommendation area 304. The card 311 is a recommended card. The card 311 includes flight information provided by a travel ticket booking APP. The flight information is information that needs to be viewed by the user in this case and that is learned through evaluation by the mobile phone from push information of a plurality of information sources. When receiving an operation performed by the user on the card 311, the mobile phone may enable the travel ticket booking APP.

In other words, push information required by the user after evaluation of the mobile phone may be preferably displayed in the recommendation area 304 of the mobile phone. In addition, in cooperation with the service card in the resident service area 302, a message of a specified information source may always be displayed, to ensure that the user can obtain comprehensive subscribed information and push information that needs to be viewed by the user in this case can be quickly obtained. In this way, human-computer interaction efficiency when the user views the push information is improved.

Certainly, the card 311 displayed in the recommendation area 304 is merely an example. In some embodiments, the mobile phone may determine, based on an identified actual scenario, a recommended card that actually needs to be displayed in the recommendation area 304.

In some embodiments, the mobile phone may converge push information from a plurality of message servers. The message server may be an information source that provides related information of an installed application, an information source that provides other hot information, or an information source that provides system information of the mobile phone. In this embodiment of this application, this is not specifically limited in this application.

In this embodiment, the push information converged by the mobile phone may also be referred to as first information. When the first information meets a preset condition, the mobile phone may create a recommended card used to display the first information, and push the recommended card to the recommendation area 304.

In an implementation, the first information may correspond to at least one of the following information: time validity information, fence information, or state information. The time validity information, the fence information, and the state information may be determined based on actual content of the first information and a message type of the first information.

For example, when the actual content of the first information includes a specific time point, the first information may correspond to the time validity information. For example, if agenda reminder information includes agenda time, the agenda reminder information corresponds to the time validity information, and the time validity information may be determined based on the agenda time. For another example, when the actual content of the first information includes a geographical name, the first information may correspond to the fence information. For example, if package pick-up information includes a position of a package pick-up station, the package pick-up information corresponds to the fence information, and the fence information may indicate the package pick-up station. For still another example, when it is pre-configured that the message type of the first information is associated with the fence information, the first information may also correspond to the fence information. For example, it is preset that bus taking information is associated with a geographical fence of a public area such as a bus station or a subway station. In this way, when the first information is a passenger code, there is correspondingly a geographical fence. For still another example, when the message type of the first information is associated with the state information, the first information may correspond to the state information.

When at least one of the time validity information, the fence information, or the state information of the first information meets a preset condition it may be determined that the first information is information that needs to be viewed in a current scenario, that is, push information 1 that matches an actual scenario.

In some possible embodiments, a manner in which the time validity information of the first information meets the preset condition includes: A time period indicated by the time validity information of the first information includes current system time of the mobile phone. The time validity information may correspond to a time point, and the time period indicated by the time validity information may be a time interval that includes the time point. Lengths of time periods indicated by time validity information of different first information may be different, or may be preconfigured by the user. When the current system time of the mobile phone belongs to the time period indicated by the time validity information, the first information corresponding to the time validity information is information that meets the preset condition.

In some possible embodiments, a manner in which the fence information of the first information meets the preset condition includes: A geographical area indicated by the fence information of the first information covers a current position of the mobile phone. After the mobile phone is located in the geographical area indicated by the fence information of the first information, the first information is also information that meets the preset condition.

In some possible embodiments, a manner in which the state information of the first information meets the preset condition includes: The state information of the first information is the same as a current state of a user holding the mobile phone. The state information may include a running state, a walking state, and a still state. Motion information detected by an acceleration sensor, a gyroscope, and the like of the mobile phone may be used to determine the current state corresponding to the user holding the mobile phone. After the current state of the user is the same as the state information of the first information, the first information is also information that meets the preset condition.

In the foregoing manners, the mobile phone may determine, in real time, the push information 1 that matches the actual scenario, and create a corresponding recommended card. In this way, the user is notified to pay attention to the push information 1.

Apparently, in some scenarios, a plurality of cards may need to be displayed in the recommendation area 304. For example, in a scenario in which the mobile phone simultaneously determines a plurality of pieces of push information 1 that match the actual scenario, the mobile phone simultaneously creates a plurality of recommended cards that are used to separately display the determined push information 1. For another example, when the recommended card displayed in the recommendation area 304 is not processed, the mobile phone determines a new recommended card based on the current actual scenario.

In this embodiment of this application, when a plurality of recommended cards need to be displayed in the recommendation area 304, the plurality of recommended cards may be stacked and displayed in the recommendation area 304. The plurality of stacked recommended cards to form a card stack.

In some examples, the card stack may be stacked in a sequence of creation time of the recommended cards, a newly created recommended card is stacked first, and a first created recommended card is stacked last. In this way, when flipping through the recommended cards, the user can first view a card that is lately created.

In other examples, the mobile phone may evaluate a priority of each recommended card according to a preset rule. The preset rule may be: The mobile phone evaluates, by using a preset artificial intelligence model (AI), an emergency degree of content displayed on the recommended card; and then, determines a priority of the recommended card based on the emergency degree of the content. Generally, a higher emergency degree of content indicates a higher priority.

Then, the recommended cards are stacked based on priorities of the recommended cards. In this way, a recommended card with a highest priority is stacked at a frontmost position and a recommended card with a lowest priority is stacked at a rear-most position. In this way, when flipping through the recommended cards, the user can first view the card with the highest priority.

Certainly, when a plurality of recommended cards have a same priority, the recommended cards with the same priority may also be stacked in a sequence of creation time.

In some embodiments, when a plurality of recommended cards are stacked, a display area occupied by the recommendation area 304 on the leftmost home screen 301 may be referred to as a first area, a display area occupied by the resident service area 302 is also referred to as a second area, and an area occupied by the function quick entry area 303 is also referred to as a third area.

In some embodiments, when a plurality of recommended cards form a card stack, the recommendation area 304 may include a view window for the card stack. The view window is used to display a top recommended card in the card stack. In other words, a card actually drawn in the recommendation area 304 is the top recommended card in the card stack.

Figure 4A:
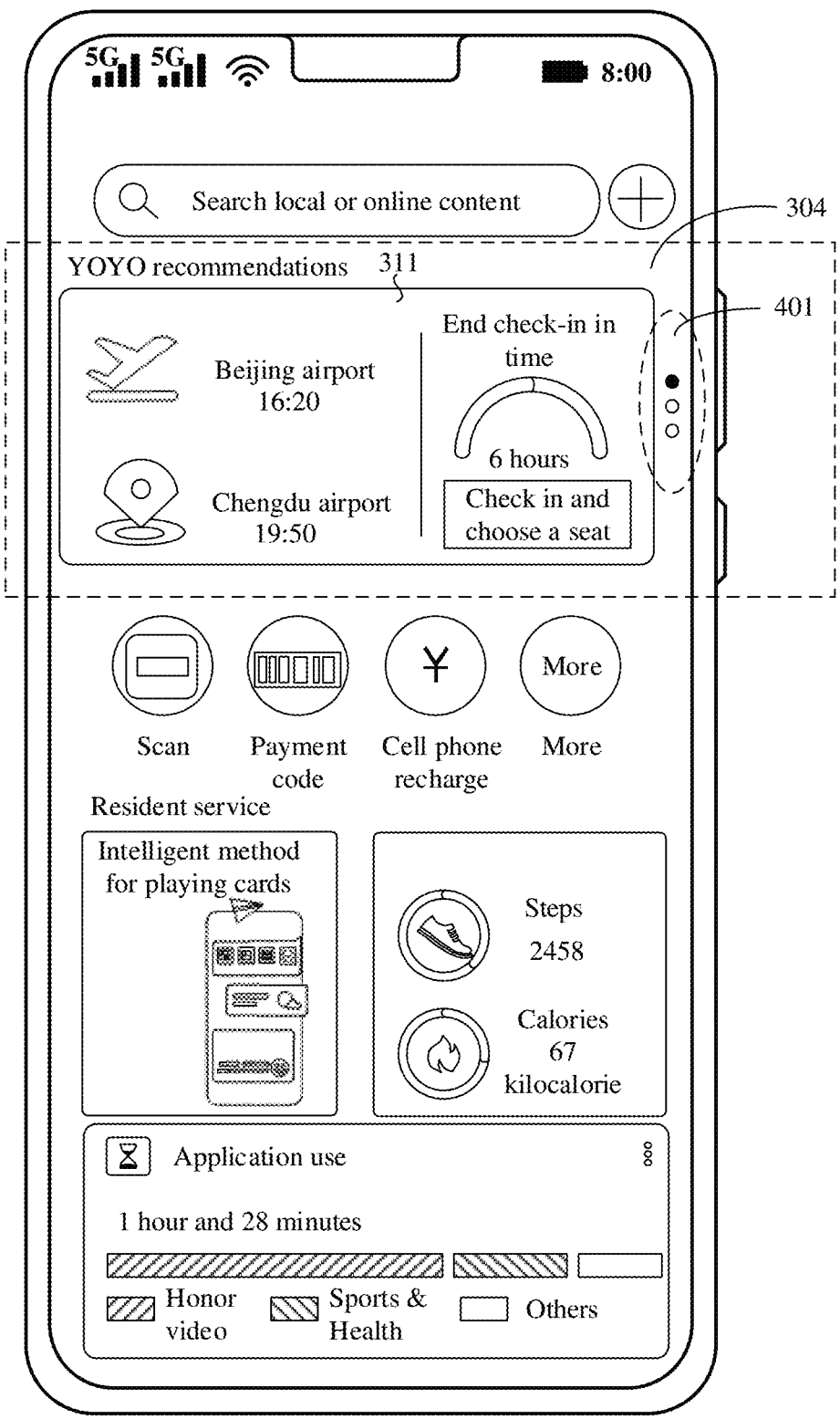
FIG. 4A(a) and FIG. 4A(b) are an example diagram 1 of display of a mobile phone according to an embodiment of this application.
Figure 4A:
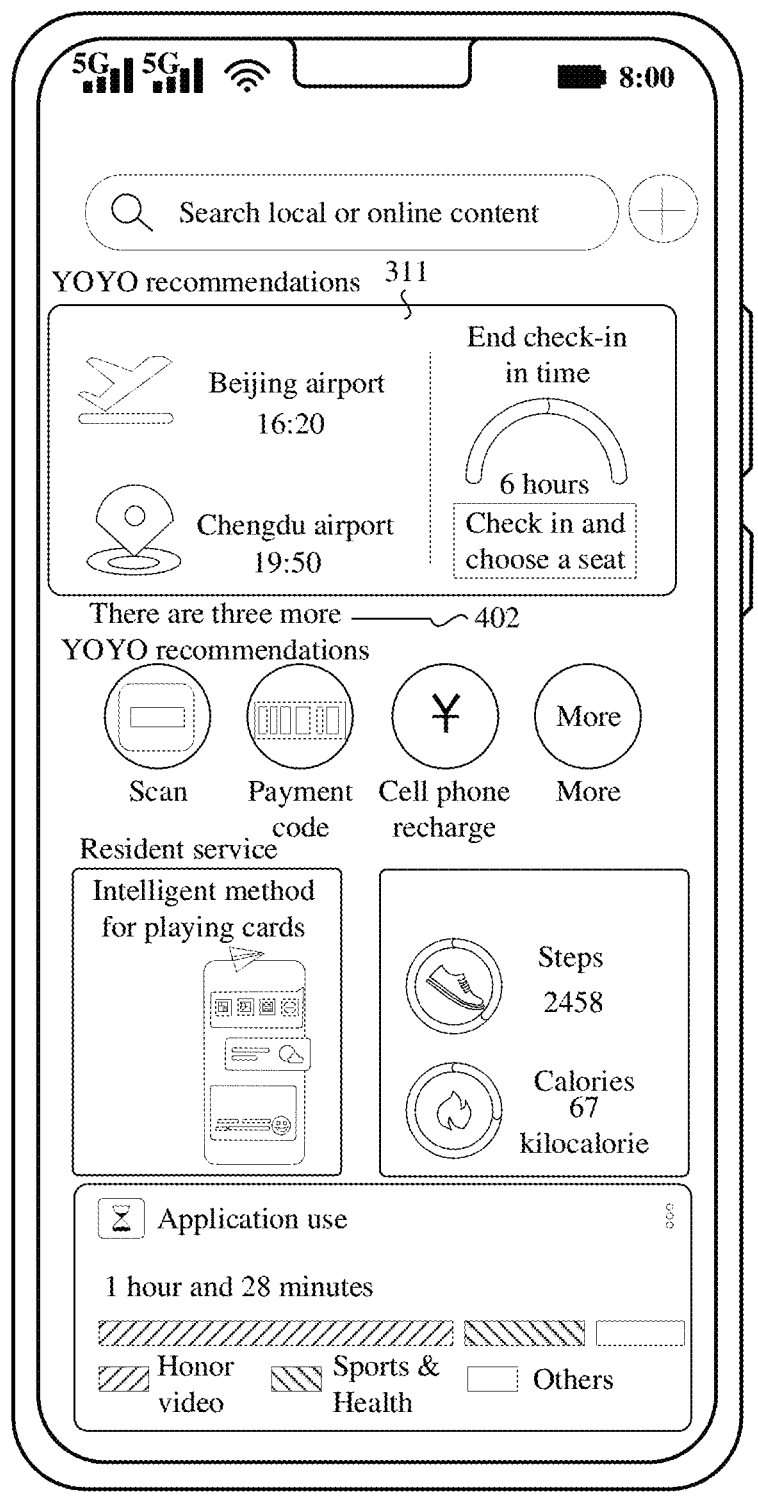

For example, as shown in FIG. 4A(a) and FIG. 4A(b), the card 311 is the top recommended card in the card stack. During display of the card stack in the recommendation area 304, an actually displayed card is the card 311. In addition, a reminder identifier may be displayed relative to the card 311, and the user is notified by using the reminder identifier that there are other cards stacked under the card 311.

For example, as shown in FIG. 4A(a), the recommendation area 304 further includes a navigation bar 401. The navigation bar 401 is correspondingly displayed for the card 311, and is used to notify the user that there are other cards stacked under the card 311, and instruct the user to view the other cards by performing an operation such as page turning. In this way, when the mobile phone receives a sliding operation 1 for the navigation bar 401 or a sliding operation 2 for the recommendation area 304, the mobile phone may change the top recommended card in the card stack, so that different recommended cards are displayed in the recommendation area 304. The sliding operation 2 may be: sliding in a direction 1. For example, the sliding operation 2 may be: sliding to the left. For another example, the sliding operation 2 may alternatively be: sliding to the right.

Figure 4B:
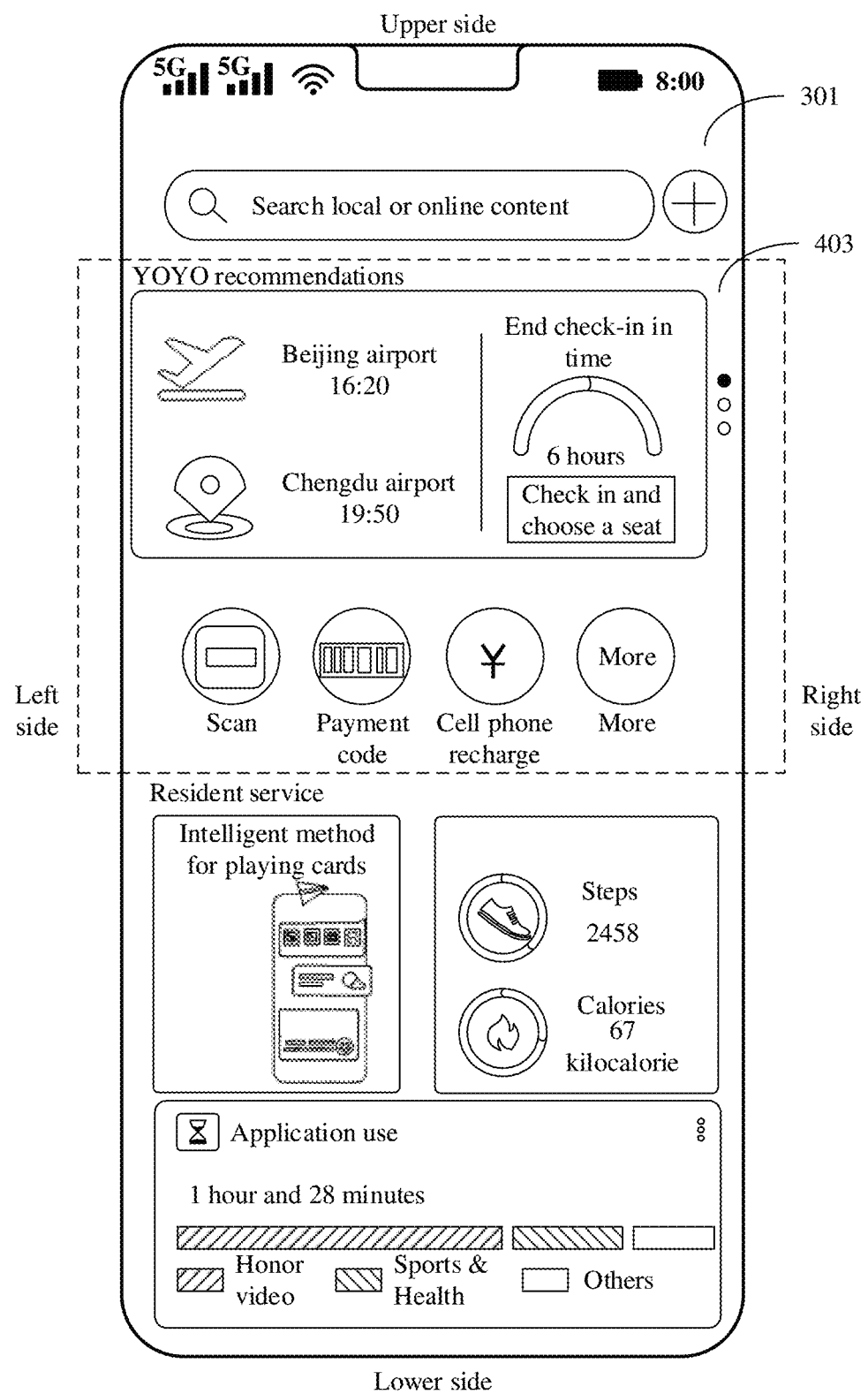
FIG. 4B is a schematic diagram of a position at which a leftmost home screen is used as a reference according to an embodiment of this application.

It should be noted that the foregoing "to the left" and "to the right" may be directions determined by using a user interface as a reference. For example, when the user interface used as the reference is the leftmost home screen 301, an upper side, a lower side, a left side, and a right side of the leftmost home screen 301 are shown in FIG. 4B. In this way, "upward" may be a direction toward the upper side of the leftmost home screen, "downward" may be a direction toward the lower side of the leftmost home screen, "leftward" may be a direction toward the left side of the leftmost home screen, and "rightward" may be a direction toward the right side of the leftmost home screen.

For another example, as shown in FIG. 4A(b), the recommendation area 304 further includes a stack identifier 402. The stack identifier 402 is also correspondingly displayed for the card 311. In addition, the user may also be reminded of a quantity of currently stacked recommended cards by using text. In this way, when the mobile phone receives a sliding operation 3 for the stack identifier 402 or a sliding operation 2 for the recommendation area 304, the mobile phone may change the top recommended card in the card stack, so that different recommended cards are displayed in the recommendation area 304.

Both the navigation bar 401 and the stack identifier 402 may be referred to as a first identifier. The first identifier may be used to notify the user that there are stacked cards in the recommendation area 304.

In the foregoing examples, the top recommended card in the card stack is changed, so that different recommended cards in the card stack are switched for display. This helps the user view the stacked recommended cards. In addition, the user can instruct the mobile phone to tile the recommended cards in the card stack, so that the user can view all the recommended cards in the card stack.

As shown in FIG. 5, a card information display method provided in an embodiment of this application may include the following steps.

S101: When a leftmost home screen is displayed on a mobile phone, the mobile phone may receive a sliding operation 4 that instructs to unfold a card stack.

In some embodiments, the sliding operation 4 may also be referred to as a first operation, and may be a sliding downward action performed by a user on a display screen. A sliding track corresponding to the sliding operation 4 starts from an area 1. The area 1 may be a display area that includes a recommendation area 304. For example, the area 1 may be a display area 403 shown in FIG. 4B. For another example, the area 1 may be an entire leftmost home screen 301; in other words, a sliding operation performed by the user at any position on the leftmost home screen 301 may be considered as the sliding operation 4.

For example, when a finger of the user is in contact with the display area 403, the mobile phone may detect a contact point between the user and the display screen of the mobile phone. Certainly, the contact point is located in the display area 403. Then, the finger of the user slides downward by using the contact point as a start point. Correspondingly, the mobile phone may detect a plurality of contact points, and positions of the plurality of contact points on the display screen may constitute a track, that is, a sliding track. When the sliding track extends downward, the mobile phone may determine that the sliding operation 4 is received.

S102: The mobile phone tiles recommended cards in the card stack in response to the sliding operation 4.

It may be understood that the recommendation area 304 is a display area that is on the leftmost home screen 301 and that is actually used to display the recommended card. A larger quantity of recommended cards that are tiled on the leftmost home screen 301 increases a display area occupied by the recommendation area 304. In other words, in some embodiments, in a process of tiling the recommended cards, display space corresponding to the recommendation area 304 gradually increases. For example, the display space occupied by the recommendation area 304 is determined by height of the tiled recommended cards.

In addition, a resident service area 302 is a display area that is on the leftmost home screen 301 and that is actually used to display a service card, and a function quick entry area 303 is a display area that is on the leftmost home screen 301 and that is actually used to display a function entry icon. As a plurality of recommended cards are tiled, the function entry icon and the service card translate downward. In this way, display areas corresponding to the resident service area 302 and the function quick entry area 303 also change.

Certainly, because display space of the leftmost home screen 301 is limited, in a process in which the service card and the function entry icon move downward, the service card and the function entry icon are sequentially hidden. In this way, the display areas occupied by the resident service area 302 and the function quick entry area 303 are also sequentially decreased. For example, as the recommended cards are tiled, a service card located on a lower side of the function entry icon is first hidden. In this way, the display area corresponding to the resident service area 302 starts to decrease. After the leftmost home screen 301 does not include the resident service area 302, if the mobile phone continues to tile the recommended cards, the function entry icon is also hidden. In this way, the display area corresponding to the function quick entry area 303 also starts to decrease until the leftmost home screen 301 does not include the function quick entry area 303.

In some embodiments, the stacked recommended cards may be tiled in the following two manners:

Manner 1: Being tiled with fingers. In other words, in process of sliding on the mobile phone, the recommended cards are tiled one by one with fingers.

In an implementation, a process in which the recommended cards are tiled one by one with fingers is as follows:

First, the mobile phone may obtain a track length corresponding to the sliding operation 4 in real time.

For example, the track length may be a distance by which the finger of the user actually slides on the display screen, and for example, is referred to as a length 1.

For another example, before the finger of the user leaves the display screen, the track distance may be the length 1. After the finger leaves the display screen, the track length may be a sum of the current length 1 and a sliding inertia distance. The sliding inertia distance may be a fixed value. Alternatively, the sliding inertia distance may be determined based on a sliding speed of the finger of the user on the display screen. For example, different speeds correspond to different sliding inertia distances.

In a process in which the track length increases, the stacked recommended cards are decreased one by one, and the recommended cards tiled for display are increased one by one.

Figure 6A:
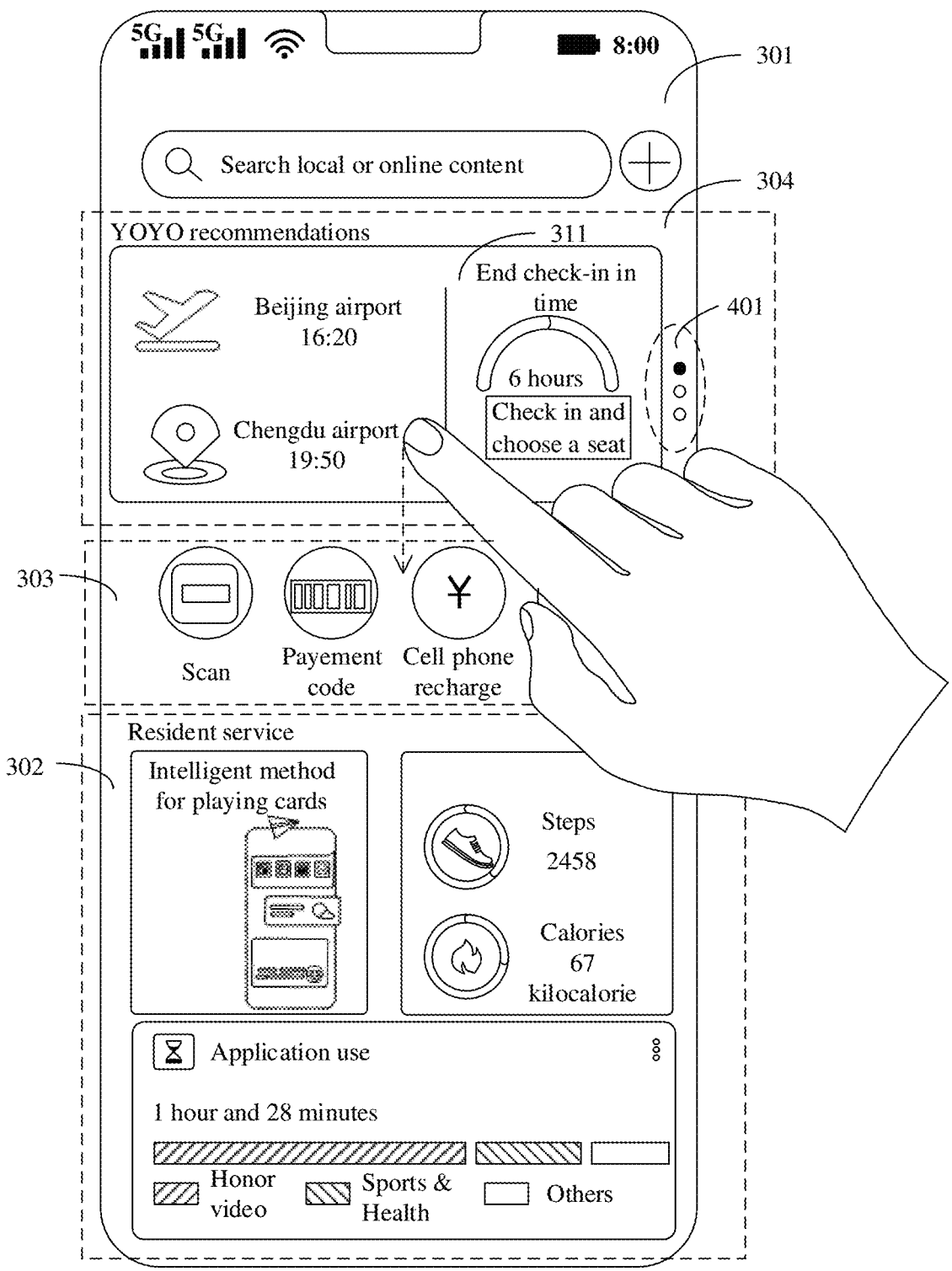
FIG. 6A(a), FIG. 6A(b), and FIG. 6A(c) are an example diagram 2 of display of a mobile phone according to an embodiment of this application.
Figure 6A:
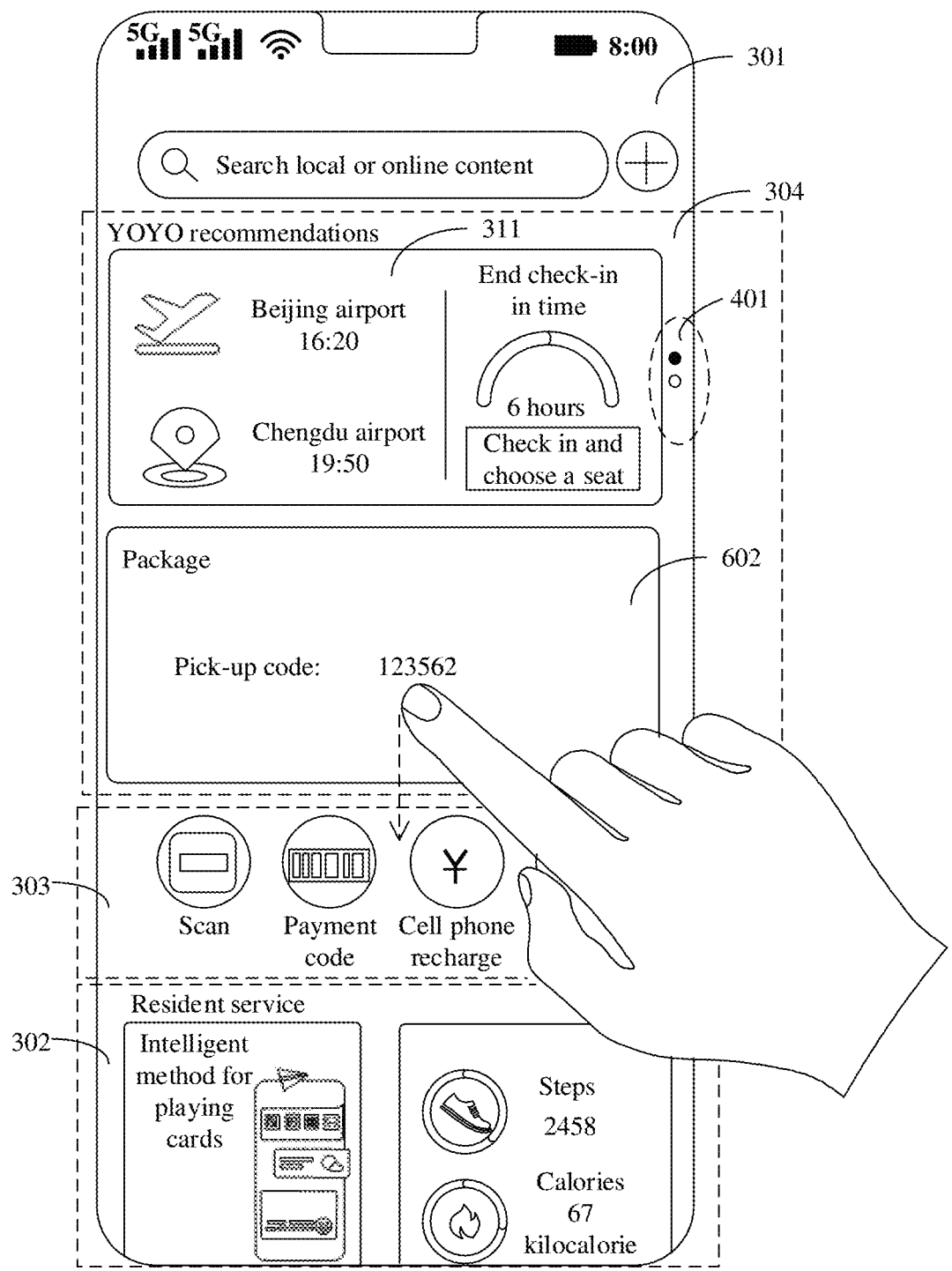
Figure 6A:
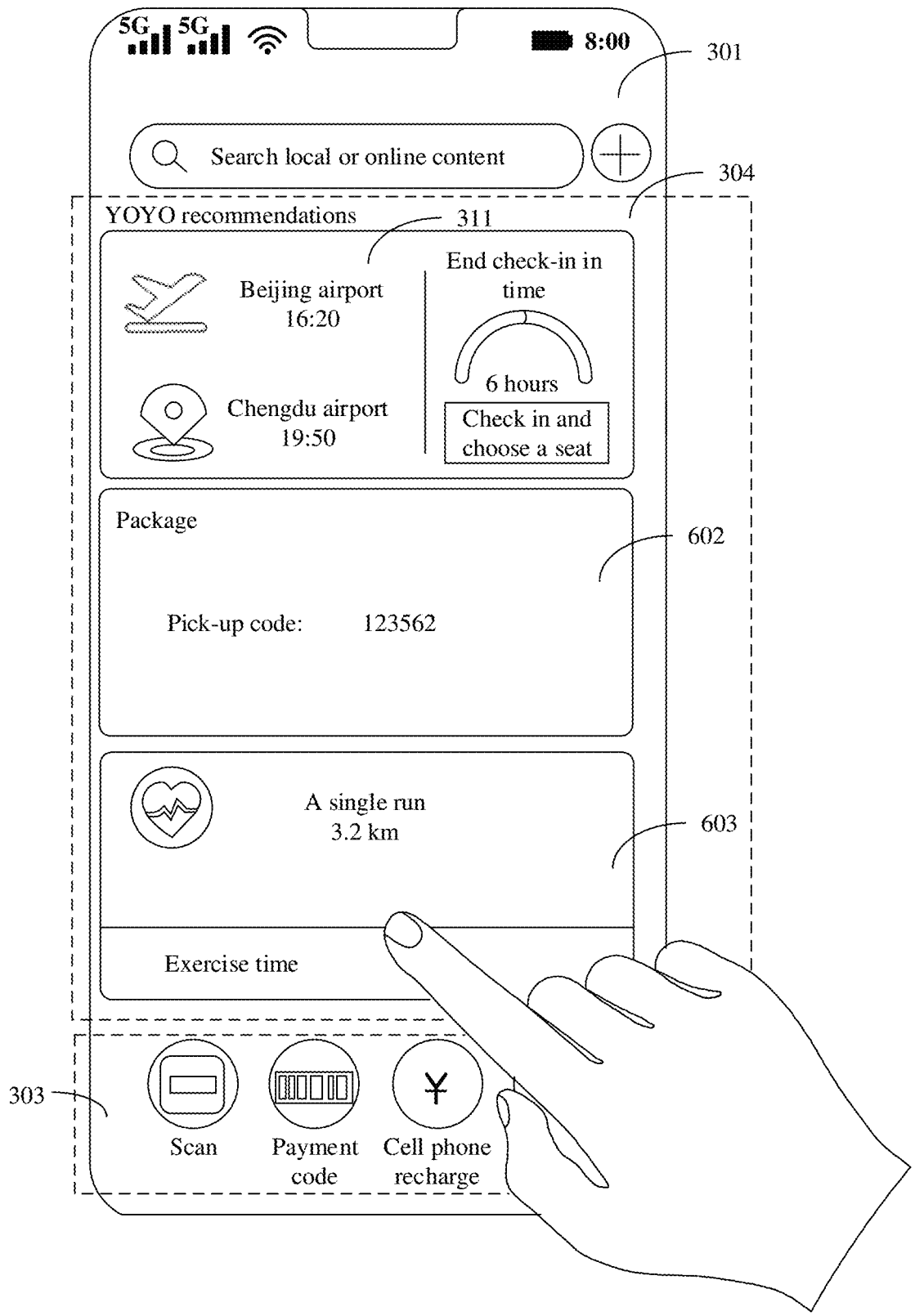

For example, when the finger of the user is recently in contact with the area 1 and has not actually slide, the mobile phone may detect a contact point in the area 1. In this case, as shown in FIG. 6A(a), only a card 311 is actually displayed on the leftmost home screen 301 of the mobile phone, and other cards are still stacked under the card 311. In addition, navigation points that are in one-to-one correspondence with the stacked recommended cards are displayed in a navigation bar 401 corresponding to a card stack. In an example corresponding to FIG. 6A(a), the navigation bar 401 may indicate that there are three recommended cards in the card stack.

Then, the finger of the user slides on the display screen. In this way, the mobile phone may detect the sliding operation 4, and obtain the track length corresponding to the sliding operation 4. It may be understood that, in a process in which the finger slides on the display screen, the track length obtained by the mobile phone also increases. In addition, in a process in which the track length increases, as shown in FIG. 6A(b), a card 602 stacked under the card 311 also slides out of the underneath of the card 311. In some examples, when the track length exceeds a first length value, the card 602 is completely displayed below the card 311. The first length value may be greater than height of a single recommended card. In other words, when the mobile phone determines that the track length corresponding to the sliding operation 4 exceeds the height of the single recommended card, the card 602 and the card 311 are tiled on the leftmost home screen 301.

Certainly, when the track distance reaches the first length value, one more recommended card is tiled on the leftmost home screen 301, and one recommended card is reduced from the recommended cards in the card stack. In this case, the navigation bar 401 is still displayed on one side of the card 311. The navigation bar 401 includes two navigation points, to notify the user that one recommended card, such as a card 603 shown in FIG. 6A(c), is further stacked under the card 311. In this scenario, the mobile phone may receive a sliding operation 2 performed by the user on the card 311, and adjust the card 603 to a top recommended card in the card stack in response to the sliding operation 2. In this way, the card 603 is displayed on the leftmost home screen 301, the card 311 is hidden, and the card 603 and the card 311 are still stacked together.

In addition, after the track length reaches the first length value, the user may further continue to slide downward on the display screen. In a sliding downward process, the track length of the sliding operation 4 continues to increase. In response to an increase of the track length, the card 603 may slide out of the underneath of the card 602. In some examples, when the track length exceeds a second length value, as shown in FIG. 6A(c), the card 603 is completely displayed below the card 602. The second length value may be height of two recommended cards, or may be slightly greater than height of two recommended cards.

It can be learned with reference to FIG. 6A(a), FIG. 6A(b), and FIG. 6A(c) that as the recommended cards tiled for display increases, the display area corresponding to the recommendation area 304 on the leftmost home screen 301 increases. Meanwhile, the function entry icon and the service card move downward in parallel. In this way, the resident service area 302 and the function quick entry area 303 gradually decrease. For example, as shown in FIG. 6A(b), when the card 602 and the card 311 are tiled on the leftmost home screen 301, some service cards are hidden, and the display area corresponding to the resident service area 302 is decreased. As shown in FIG. 6A(c), when the card 602, the card 603, and the card 311 are tiled on the leftmost home screen 301, because remaining display space on the leftmost home screen 301 is only enough to display the function entry icon, all service cards are hidden, and the leftmost home screen 301 does not include the resident service area 302.

In addition, after all the recommended cards in the card stack are tiled, as shown in FIG. 6A(c), display of the navigation bar is further canceled in the recommendation area 304, to indicate that the recommendation area does not include stacked cards.

Figure 6B:
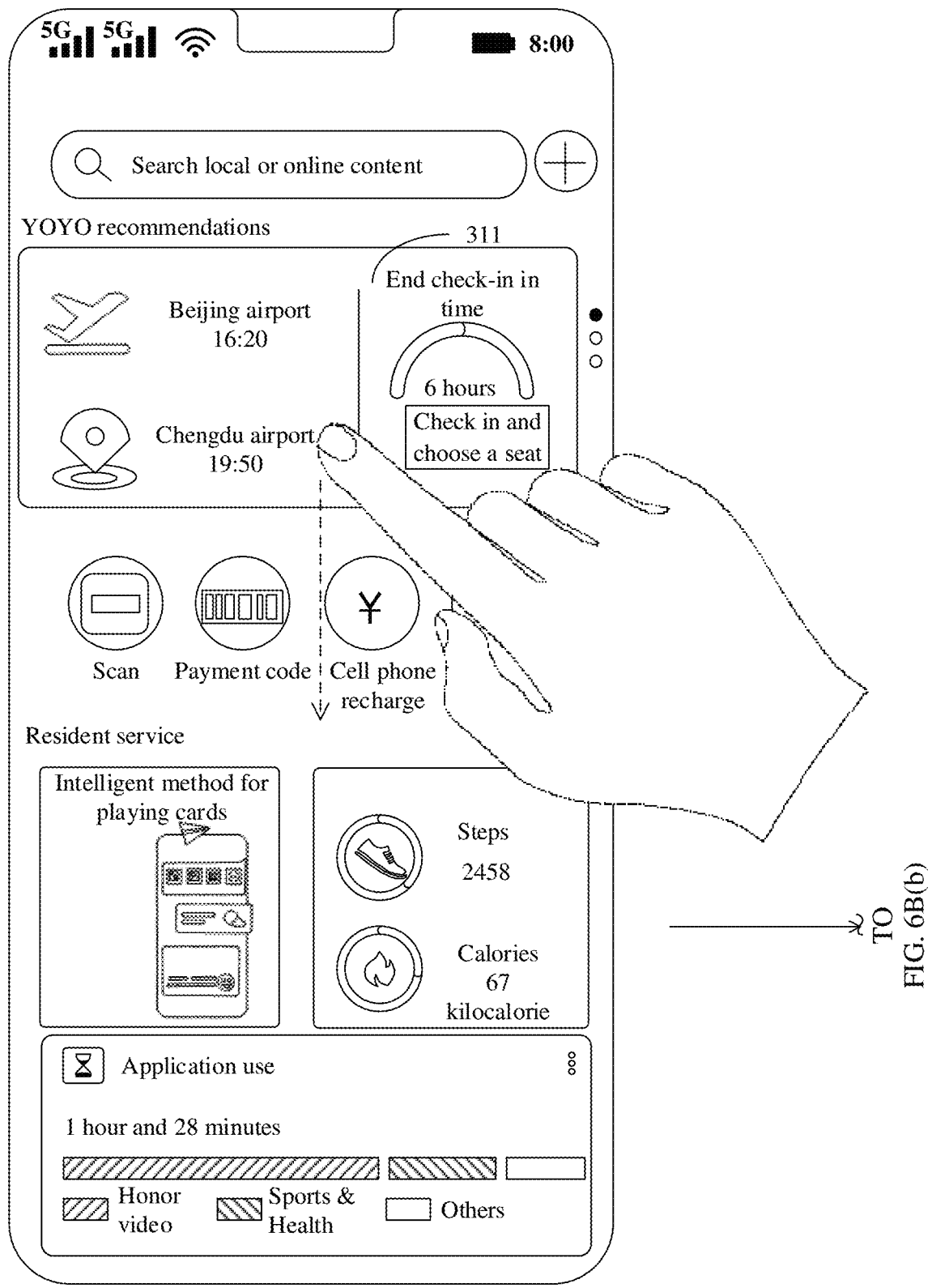
FIG. 6B(a), FIG. 6B(b), and FIG. 6B(c) are an example diagram 3 of display of a mobile phone according to an embodiment of this application.
Figure 6B:
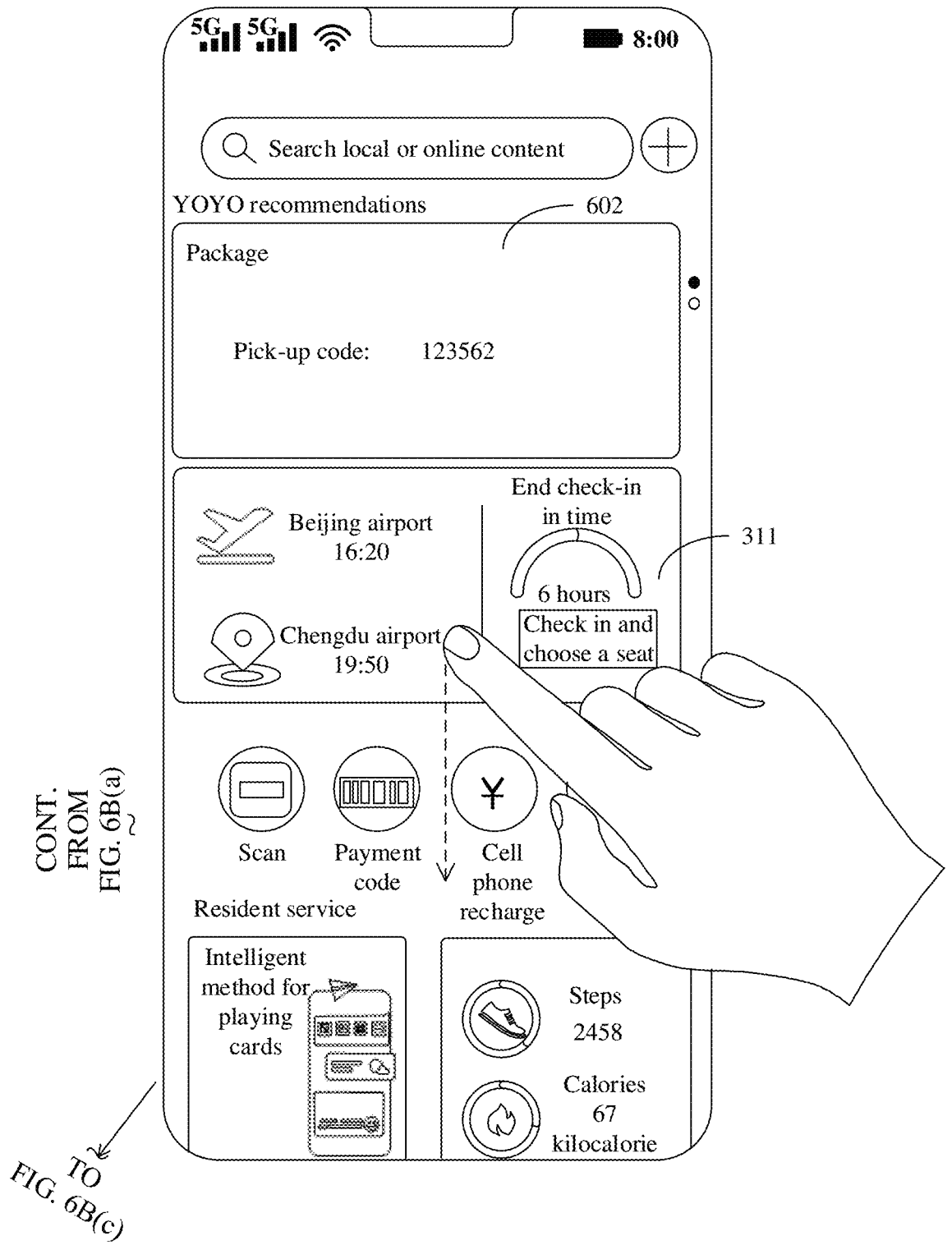
Figure 6B:
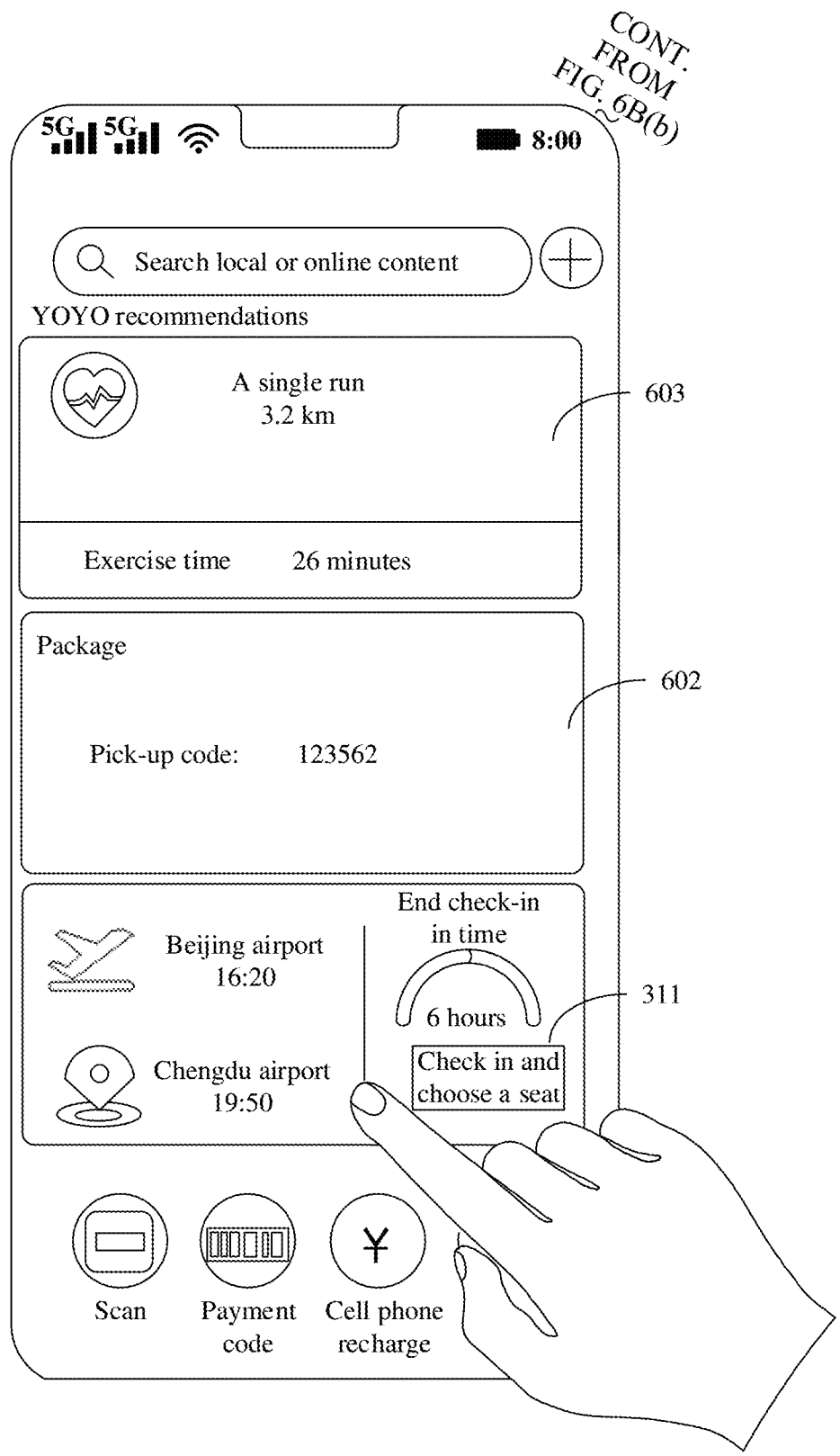

For another example, as shown in FIG. 6B(a), FIG. 6B(b), and FIG. 6B(c), in a process in which the track length corresponding to the sliding operation 4 increases, the card 311 may further slide downward with the finger of the user, and then a recommended card stacked under the card 311 is gradually exposed. In other words, when the track length reaches the first length value, the card 602 is completely exposed. In this case, the card 311 is located below the card 602. In a process in which the track length increases from the first length value to the second length value, the card 602 and the card 311 simultaneously move downward. In this way, the recommended card stacked under the card 602, that is, the card 603, is also gradually exposed. After the track length reaches the second length value, the card 603 is completely exposed. In this case, the card 603 is located above the card 602.

Manner 2: Being unfolded simultaneously. In other words, after it is determined that the sliding operation 4 is received, the mobile phone simultaneously tile all the recommended cards in the card stack on the leftmost home screen 301.

In some embodiments, after all the stacked recommended cards are tiled in any one of the foregoing manners, the leftmost home screen 301 includes at least two hotspots, such as a hotspot 1 and a hotspot 2. It may be understood that the hotspot is an area that is linked on a user interface (such as the leftmost home screen).

Figure 7A:
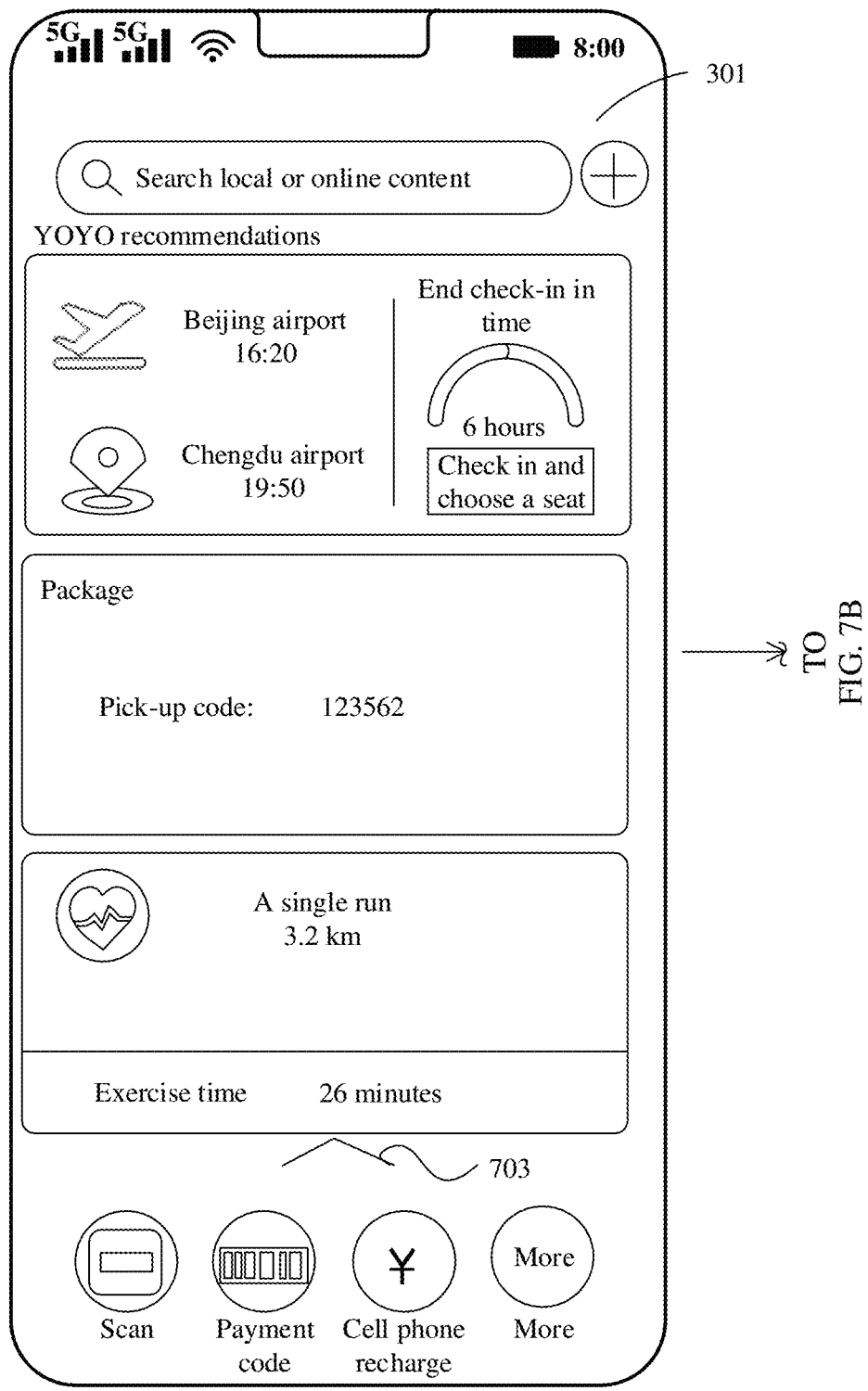
FIG. 7A and FIG. 7B are a schematic diagram of a hotspot of a leftmost home screen according to an embodiment of this application.
Figure 7B:
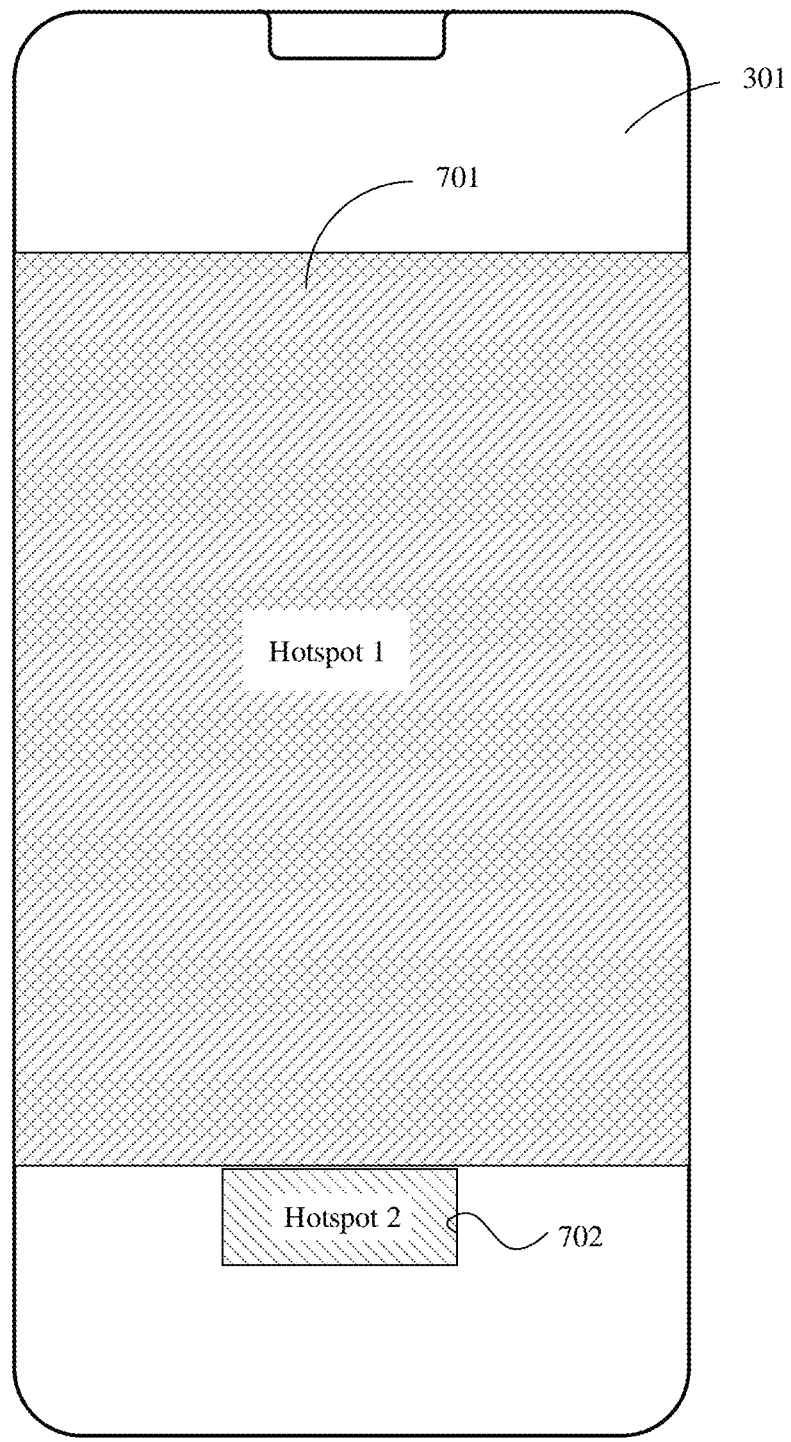

For example, the hotspot 1 may be a hotspot corresponding to the recommended card, for example, an area 701 in FIG. 7A and FIG. 7B. The area 701 is used to link an operation response to the recommended card. In addition, the hotspot 2 may be a hotspot corresponding to a return control (a control 703), for example, an area 702 in FIG. 7A and FIG. 7B. The return control may be used to instruct to fold the tiled recommended cards again, and is also referred to as a first control. The area 702 is linked with an operation response instructing to fold the recommended cards.

In addition, when different quantities of recommended cards are tiled, the hotspot 1 and the hotspot 2 correspond to different display positions. Especially for the hotspot 1, when different quantities of recommended cards are unfolded, a range covered by the hotspot 1 is different, and an operation response linked with the hotspot 1 is also different.

S103: When display space occupied by the tiled recommended cards is not greater than one screen, the mobile phone may stack the plurality of recommended cards again in response to an operation performed by the user on the hotspot 1 or the hotspot 2.

In some embodiments, the mobile phone may determine, based on total height, also referred to as first height, corresponding to the tiled recommended cards, whether display space occupied by the tiled recommended cards exceeds one screen.

For example, the total height may be a distance value between an upper edge of a recommended card 1 and a lower edge of a recommended card 2. The recommended card 1 is a first recommended card that is tiled. In addition, the recommended card 2 is a last recommended card that is tiled.

For example, on the leftmost home screen 301 shown in FIG. 6A(a), the recommended card 1 may be the card 311, and the recommended card 2 may also be the card 311.

On the leftmost home screen 301 shown in FIG. 6A(a), the corresponding total height is a distance between an upper edge and a lower edge of the card 311, that is, card height of the card 311. For another example, on the leftmost home screen 301 shown in FIG. 6A(b), the recommended card 1 may be the card 311, and the recommended card 2 may be the card 602. On the leftmost home screen 301 shown in FIG. 6A(a), the corresponding total height is a value of a distance between an upper edge of the card 311 and a lower edge of the card 602. For still another example, on the leftmost home screen 301 shown in FIG. 6A(c), the recommended card 1 may be the card 311, and the recommended card 2 may be the card 603. On the leftmost home screen 301 shown in FIG. 6A(c), the corresponding total height is a value of a distance between an upper edge of the card 311 and a lower edge of the card 603.

For another example, on the leftmost home screen 301 shown in FIG. 6B(a), FIG. 6B(b), and FIG. 6B(c), in a process of tiling the recommended cards, the recommended card 1 sequentially changes from the card 311 to the card 602 and then to the card 603, but the recommended card 2 is always the card 311.

It may be understood that, in a process of rendering the leftmost home screen by the mobile phone, information such as a size (for example, a width value and a height value), a layout, and depth of each element (for example, a card or a control) of the leftmost home screen is determined. In this way, not only in a process of tiling the recommended cards, the mobile phone may obtain, in real time, total height corresponding to the tiled recommended cards based on card height and a layout spacing of the tiled recommended cards, but after the recommended cards are tiled, the mobile phone may also obtain the total height corresponding to the tiled recommended cards.

For another example, the total height may be a sum of card height of all the recommended cards. In this way, in a process of rendering the leftmost home screen, the mobile phone may determine total height corresponding to the tiled recommended cards based on determined card height of each recommended card.

For another example, total height corresponding to different quantities of recommended cards may be preconfigured in the mobile phone. In this way, the mobile phone may determine the corresponding total height based on a quantity of tiled recommended cards.

After obtaining the total height of the tiled recommended cards, the mobile phone compares the total height with a screen height value 1 (also referred to as second height). It should be noted that the screen height value 1 is a maximum height value of a display area that can be used to display a card on the leftmost home screen. For example, the screen height value 1 may be a specified fixed value. For another example, leftmost home screens of different sizes may correspond to different screen height values 1. In other words, a correspondence between leftmost home screens of different sizes and different screen height values 1 is preconfigured in the mobile phone. After a size of the leftmost home screen displayed on the mobile phone is determined, a corresponding screen height value 1 may be determined.

When the total height does not exceed the screen height value 1, the mobile phone may determine that display space occupied by the tile recommended cards is less than one screen. For example, on the leftmost home screen 301 shown in FIG. 6A(a), FIG. 6A(b), and FIG. 6A(c), the total height of the tile recommended cards does not exceed the screen height value 1.

When display space of the recommended cards is less than one screen, the mobile phone may receive an operation performed by the user in the hotspot 1 or the hotspot 2, and stack the plurality of recommended cards again in response to the operation.

For example, as shown in FIG. 8(*a*), the mobile phone may receive a tapping operation performed by the user in the hotspot 2 (that is, the area 702). The mobile phone may display, in response to the tapping operation, the leftmost home screen 301 shown in FIG. 8(*c*). In other words, the tiled recommended cards are stacked again, so that the mobile phone can control the function entry icon and the service card to move upward in parallel. After the recommended cards are stacked, the recommended cards are displayed again in the first area on the leftmost home screen 301. It can be seen that display space occupied by the recommendation area 304 is reduced. The card stack and a navigation bar corresponding to the card stack may be displayed in the recommendation area 304 again. In addition, the second area on the leftmost home screen 301 is again used to display the service card.

For another example, as shown in FIG. 8(*b*), the mobile phone may receive a sliding upward operation 1 performed by the user in the hotspot 1 (that is, the area 701), and the sliding upward operation 1 is also referred to as a first sliding upward operation. The mobile phone may display: in response to the sliding upward operation 1, the leftmost home screen 301 shown in FIG. 8(*c*). In other words, the tiled recommended cards are stacked again.

It can be learned that regardless of whether the recommended cards change from a stacked state to a tiled state or from a tiled state to a stacked state, a change in the leftmost home screen displayed on the mobile phone mainly includes: The display space occupied by the recommendation area 304 changes, and display positions of the resident service area 302 and the function quick entry area 303 change.

In the foregoing examples, when all the stacked recommended cards are unfolded, corresponding display space does not exceed one screen. In some scenarios, for example, when a large quantity of recommended cards are stacked on the leftmost home screen 301, display space occupied by all the recommended cards after the recommended cards are tiled exceeds one screen.

A process of tiling the recommended cards with fingers is described again below by using an example in which display space corresponding to all the recommended cards after the recommended cards are tiled exceeds one screen.

When the finger of the user is recently in contact with an area 1 and has not actually slide, the mobile phone may detect a contact point in the area 1. In this case, as shown in FIG. 9(*a*), only a card 311 is actually displayed on the leftmost home screen 301 of the mobile phone, and other cards are still stacked under the card 311. In addition, navigation points that are in one-to-one correspondence with the stacked recommended cards are displayed in a navigation bar 401 corresponding to a card stack. In an example corresponding to FIG. 9(*a*), the navigation bar 401 may indicate that there are four recommended cards in the card stack.

Then, the finger of the user slides on the display screen. In this case, the mobile phone may detect a sliding operation 4, and obtain a track length corresponding to the sliding operation 4. It may be understood that, in a process in which the finger slides on the display screen, the track length obtained by the mobile phone also increases. In addition, in a process in which the track length increases, as shown in FIG. 9(*b*), a card 602 stacked under the card 311 also slides out of the underneath of the card 311. In some examples, when the track length exceeds a first length value, the card 602 is completely displayed below the card 311. In this case, the card 602 and the card 311 are tiled on the leftmost home screen 301.

Certainly, when the track distance reaches the first length value, the navigation bar 401 is still displayed on one side of the card 311. In this case, the navigation bar 401 includes three navigation points, to notify the user that two recommended cards are further stacked under the card 311, for example, a card 603 shown in FIG. 9(*c*) and a card 901 shown in FIG. 9(*d*). In this scenario, the mobile phone may receive a sliding operation 2 performed by the user on the card 311, and in response to the sliding operation 2, adjust the card 603 to a top recommended card in the card stack, or adjust the card 901 to a top recommended card in the card stack. In this way, the card 603 or the card 901 may be displayed on the leftmost home screen 301, and the card 311 is hidden. In this case, the card 603, the card 901, and the card 311 are still stacked together.

In addition, after the track length reaches the first length value, the user may further continue to slide downward on the display screen. In a sliding downward process, the track length of the sliding operation 4 continues to increase. In response to an increase of the track length, the card 603 may slide out of the underneath of the card 602. In some examples, when the track length exceeds a second length value, as shown in FIG. 9(*c*), the card 603 is completely displayed below the card 602. The second length value may be height of two recommended cards, or may be slightly greater than height of two recommended cards. In this case, three recommended cards are tiled, and there is still one recommended card such as the card 901 stacked under the card 311. In this scenario, the mobile phone may receive a sliding operation 2 performed by the user on the card 311, and adjust the card 901 to a top recommended card in the card stack in response to the sliding operation 2. In this way, the card 901 may be displayed on the leftmost home screen 301, and the card 311 is hidden. In this case, the card 901 and the card 311 are still stacked together.

Therefore, after the track length reaches the second length value, the user may further continue to slide downward on the display screen. In a sliding downward process, the track length of the sliding operation 4 continues to increase. In response to an increase of the track length, the card 901 may slide out of the underneath of the card 603.

When the track length reaches a screen height value 1, the mobile phone tiles all the stacked recommended cards. In this scenario, because display space of the leftmost home screen 301 is limited, as shown in FIG. 9(*d*), only a partial area of the card 901 is displayed on the leftmost home screen 301. In addition, display of the navigation bar corresponding to the card stack may be further canceled on the leftmost home screen 301, to indicate that there are no stacked cards in the recommendation area 304.

In other words, when all the four recommended cards are tiled, corresponding display space exceeds one screen. When the corresponding display space exceeds one screen, only a first part of the four tiles recommended cards, such as the card 311, the card 602, the card 603, and a part of the card 901, can be displayed on the leftmost home screen.

In other examples, in a process in which the track length corresponding to the sliding operation 4 increases, the card

311 may further slide downward with the finger of the user, and then recommended cards stacked under the card 311 are gradually exposed, for example, the card 602, the card 603, and the card 901 are gradually exposed. In addition, the card 901, the card 603, the card 602, and the card 311 are arranged in sequence.

It can be learned with reference to FIG. 9(*a*), FIG. 9(*b*). FIG. 9(*c*), and FIG. 9(*d*) that as the recommended cards tiled for display increases, the recommendation area 304 on the leftmost home screen 301 increases. After the recommendation area 304 is expanded, the mobile phone controls the function entry icon and the service card move downward in parallel. Because display space of the leftmost home screen 301 is limited, the function entry icon and the service card are gradually hidden in a process in which the function entry icon and the service card move downward. For example, as shown in FIG. 9(*b*), when the card 602 and the card 311 are tiled on the leftmost home screen 301, some service cards are hidden, and the display area corresponding to the resident service area 302 decreases. As shown in FIG. 9(*c*), when the card 602, the card 603, and the card 311 are tiled on the leftmost home screen 301, because remaining display space on the leftmost home screen 301 is only enough to display the function entry icon, all service cards are hidden, and the leftmost home screen 301 in this case does not include the resident service area 302. As shown in FIG. 9(*d*), after all recommended cards are tiled, required display space exceeds one screen. In this case, the mobile phone further hides the function entry icon on the leftmost home screen 301, and in addition, some unfolded recommended cards are also hidden.

In other words, when the display space required by the tiled recommended cards exceeds one screen, the recommended card 2 is not directly displayed on the leftmost home screen 301 or is not completely displayed on the leftmost home screen 301. The recommended card 2 is a bottommost card in the tiled recommended cards.

S104: When the display space occupied by the tiled recommended cards is greater than one screen, the mobile phone may stack the plurality of recommended cards again in response to a tapping operation performed by the user on a hotspot 4 or a plurality of sliding upward operation performed by the user on a hotspot 3.

In some embodiments, when the total height of the tiled recommended cards exceeds the screen height value 1, the mobile phone may determine that the display space corresponding to the recommended cards is not less than one screen. In this case, the leftmost home screen 301 includes the hotspot 3 and the hotspot 4. The hotspot 3 is a hotspot corresponding to the recommended card. The hotspot 4 is a hotspot corresponding to a return control. The return control may be used to instruct to fold the tiled recommended cards again.

As shown in FIG. 10(*a*)(1) and FIG. 10(*a*)(2), after recommended cards are tiled, total height of the tiled recommended cards exceeds the screen height value 1. In this case, the leftmost home screen 301 includes an area 1001 and an area 1002. The area 1001 is a hotspot corresponding to the recommended card. The area 1002 is a hotspot corresponding to a control 1003. The control 1003 may also be referred to as a first control, and is used to instruct to fold the tiled cards again. In this way, the area 1002 is linked with an operation response to stacking the recommended cards.

When a recommended card 2 is not displayed or is not completely displayed on the leftmost home screen 301, the mobile phone may receive a sliding upward operation performed by the user in the hotspot 3 (that is, the area 1001).

For example, the sliding upward operation is referred to as a sliding upward operation 2, that is, a second sliding upward operation. In addition, the mobile phone may gradually display a hidden recommended card in response to the sliding upward operation 2 until the recommended card 2 is completely displayed on the leftmost home screen 301.

In other words, the mobile phone controls, based on the second sliding upward operation, a first part of the tiled recommended cards to translate upward, and displays a second part of the tiled recommended cards, for example, a lower part of the card 901.

For example, as shown in FIG. 10(*b*)(1) and FIG. 10(*b*)(2), when the card 901 is not completely displayed on the leftmost home screen 301, the mobile phone gradually displays the hidden card 901 on the leftmost home screen 301 in response to the sliding upward operation 2, and at the same time, hides a recommended card that is arranged on an upper side, such as the card 311. In this way, in a visual dimension, a visual effect of upturning the recommended cards is implemented until the recommended card 2 is completely displayed on the leftmost home screen 301.

As shown in FIG. 11(*a*)(1) and FIG. 11(*a*)(2), when the recommended card 2 is completely displayed on the leftmost home screen 301, the mobile phone may receive a sliding upward operation performed by the user in the hotspot 3 (that is, the area 1001). For example, the sliding upward operation is referred to as a sliding upward operation 3, that is, a third sliding upward operation. Then, the mobile phone may stack the tiled recommended cards on the leftmost home screen 301 again in response to the sliding upward operation 3, as shown in FIG. 11(*b*).

In addition, when the mobile phone receives an operation performed by the user in the hotspot 4 (that is, the area 1002), as shown in FIG. 11(*b*), the mobile phone may also stack the tiled recommended cards on the leftmost home screen 301 again.

In some embodiments, after the recommended cards are stacked again, the mobile phone may continue to receive a sliding upward operation performed by the user on the leftmost home screen, for example, a fourth sliding upward operation, and pull up the service card: in other words, the mobile phone continues to control the stacked recommended cards, the function entry icon, and the service card to continue to translate upward. Limited by the display space of the leftmost home screen, in a process in which the recommended cards, the function entry icon, and the service card translate upward, the mobile phone sequentially hides the stacked recommended cards and the function entry icon until only the service card is displayed on the leftmost home screen. In this case, the resident service area 302 on the leftmost home screen is expanded, and the mobile phone may display some hidden service cards. When only the resident service area 302 is displayed on the leftmost home screen, the mobile phone may further receive a sliding upward operation performed by the user on the leftmost home screen, and in response to the operation, scroll to display the service cards in the resident service area 302, for example, control to display the other hidden service cards, so that the user can view all the service cards. Certainly: in a process of scrolling to display the service cards, limited by the display space of the leftmost home screen, a service card that is originally close to the function quick entry area is hidden first.

Figure 9A:
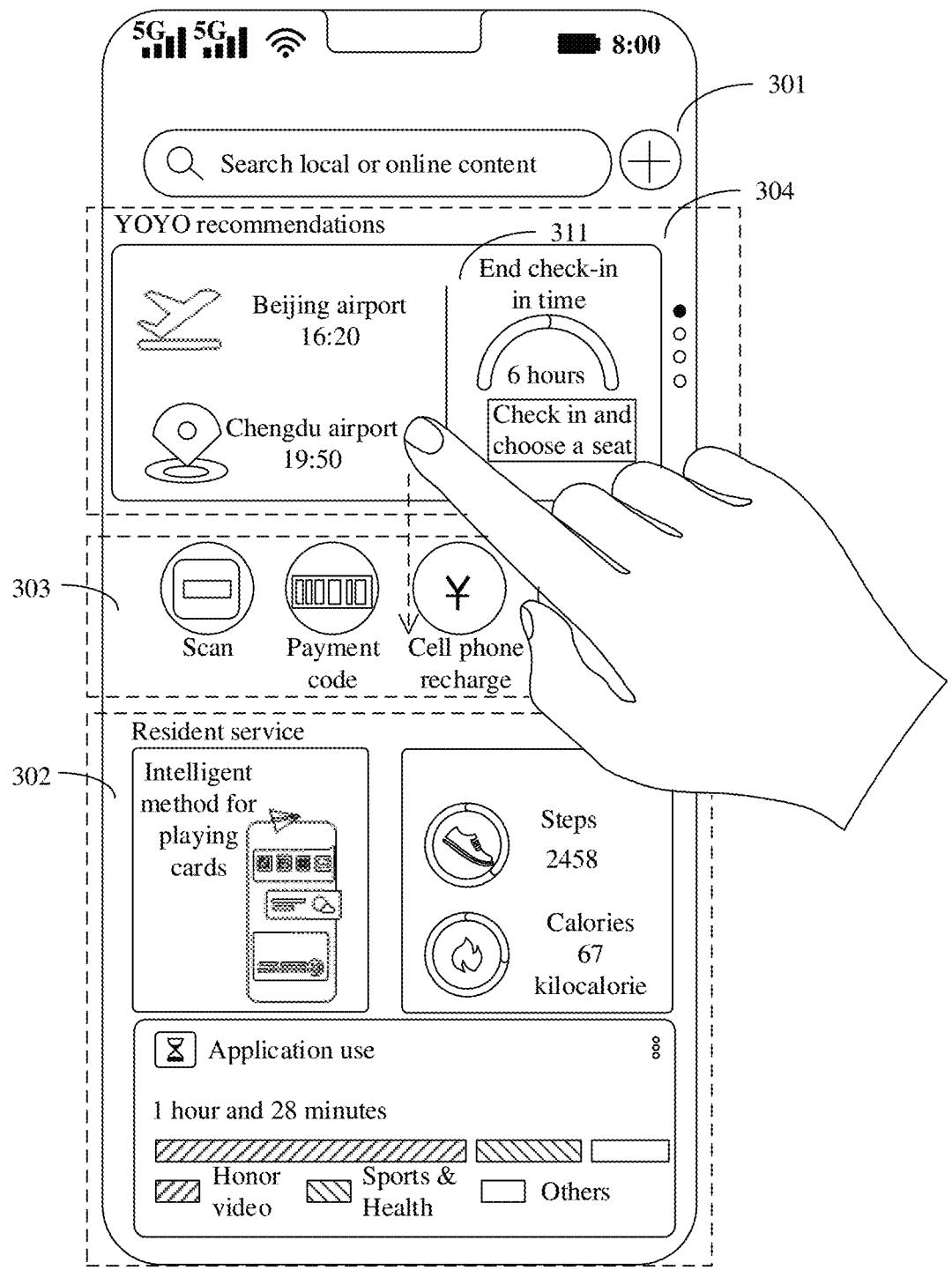
FIG. 9(a), FIG. 9(b), FIG. 9(c), and FIG. 9(d) are an example diagram 5 of display of a mobile phone according to an embodiment of this application.
Figure 9B:
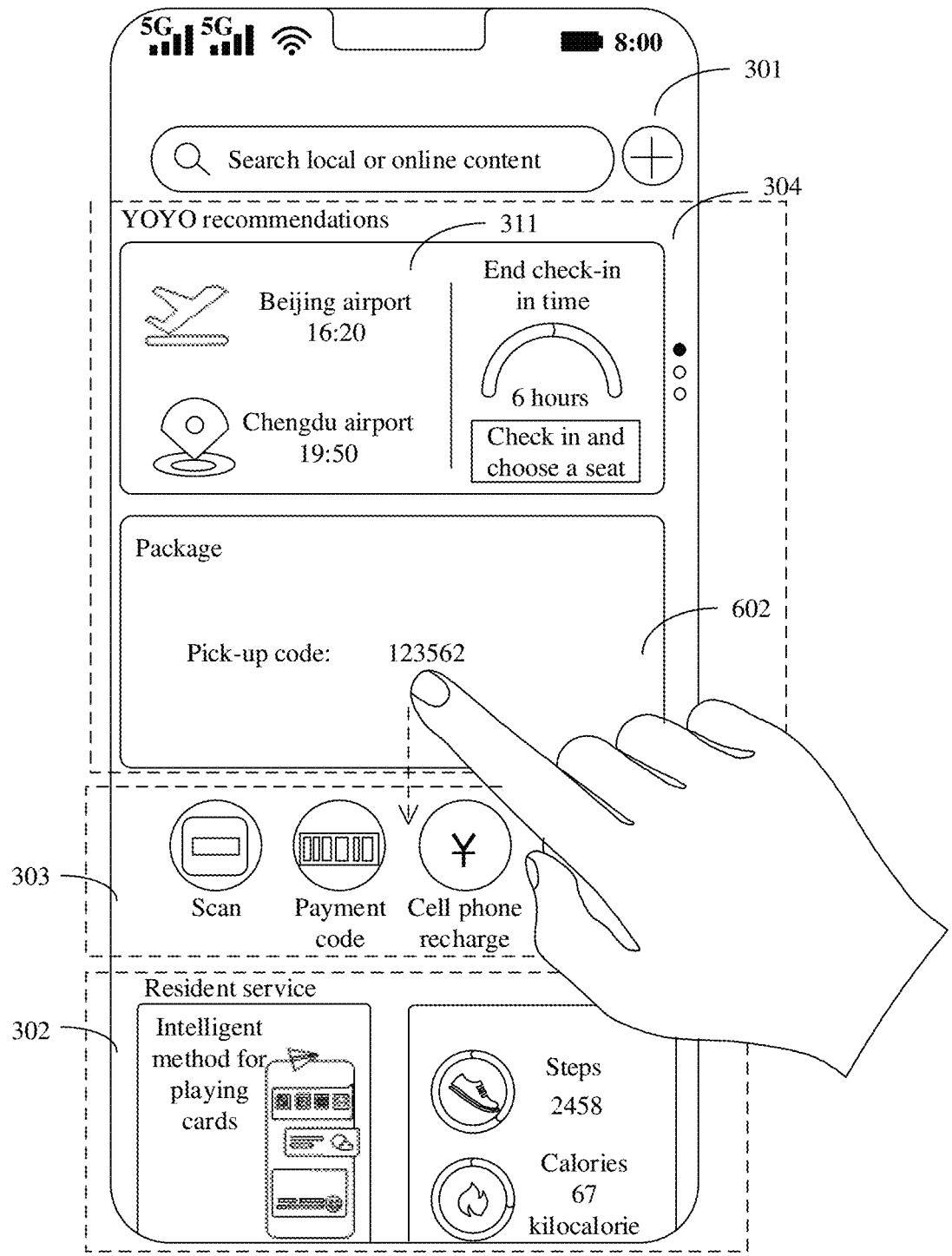
Figure 9C:
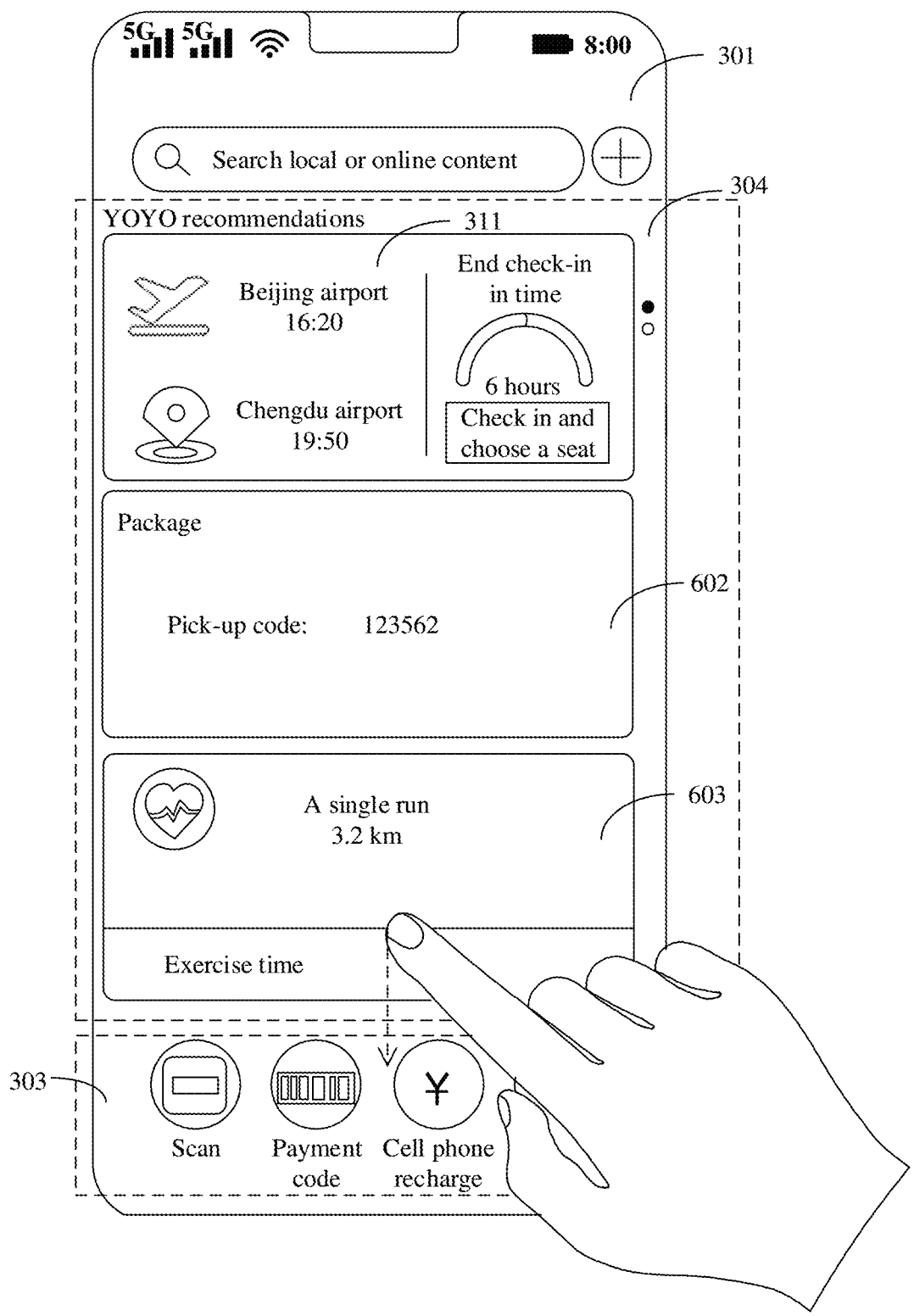
Figure 9D:
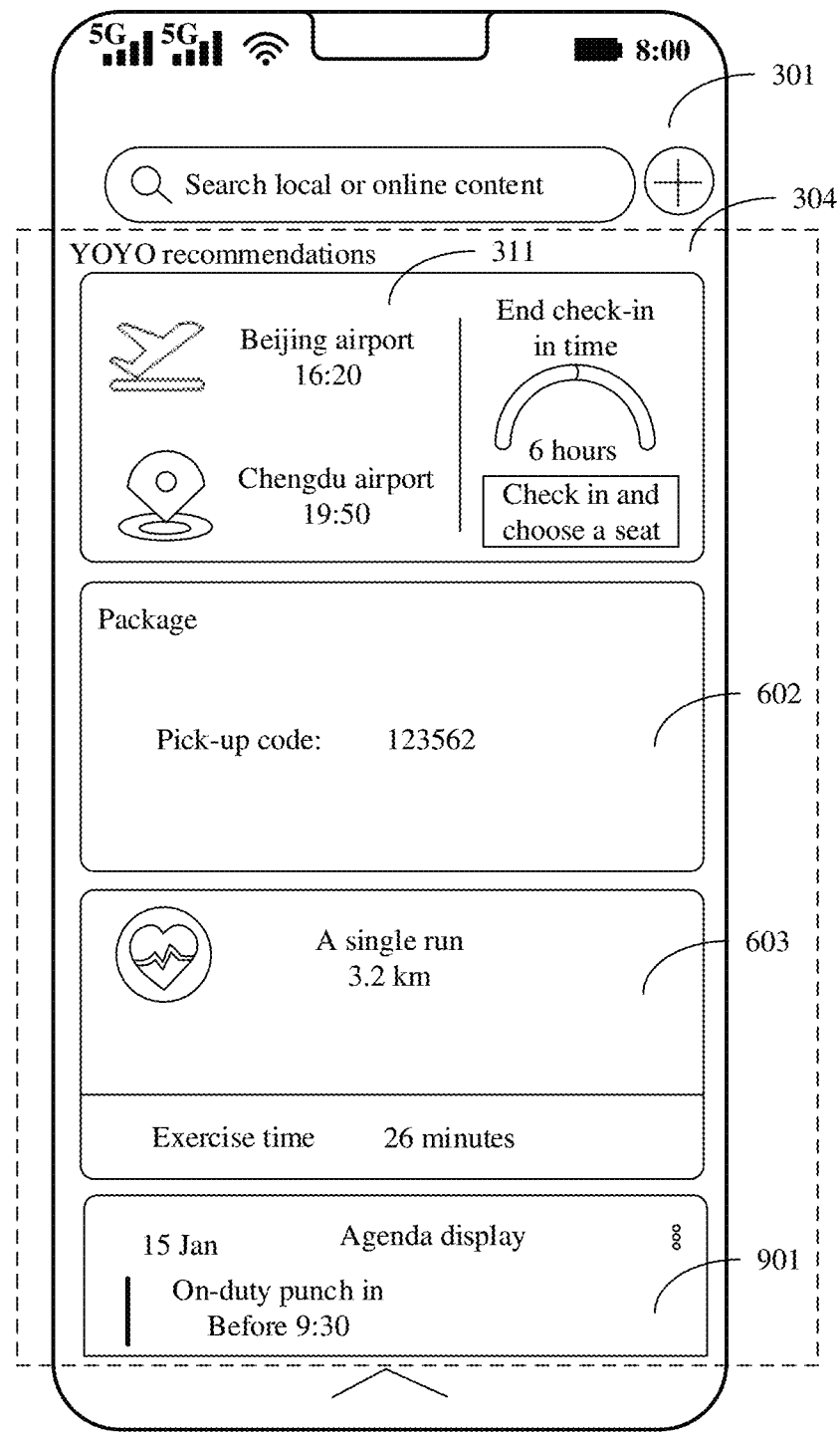

In addition, in some embodiments, in a process in which the mobile phone unfolds the stacked recommended cards, the recommended cards may be sequentially tiled in a stacking sequence, as shown in FIG. 6A(a). FIG. 6A(b), and FIG. 6A(c) or FIG. 9(a). FIG. 9(b). FIG. 9(c), and FIG. 9(d). In other embodiments, the mobile phone may preferentially tile a card for which there is a service association with a displayed recommended card.

In an implementation, when the mobile phone determines that the sliding operation 4 of the user is received, the mobile phone queries the card stack for a card associated with a top recommended card (which is referred to as a top card for example). The associated card may be a recommended card that has a service relationship with the top card.

For example, each recommended card may correspond to a service attribute and an information source. When service attributes or information sources of a plurality of recommended cards are the same, the mobile phone may determine that the plurality of recommended cards are associated cards. For example, when an agenda card 1 and an agenda card 2 are recommended cards that belong to a same card stack, information sources corresponding to the agenda card 1 and the agenda card 2 are the same and service attributes are also the same. Therefore, the agenda card 1 and the agenda card 2 are associated cards.

For another example, the mobile phone may determine, by using a preset AI model, whether there is an association between display content of the plurality of recommended cards. When determining that displayed content is associated, it is determined that the plurality of recommended cards are associated cards. For example, the card 311 and a card 1201 in FIG. 12(a) and FIG. 12(b) belong to a same card stack. The card 311 is used to display flight information, and the card 1201 is configured to display a travel suggestion for navigating to an airport. The mobile phone may identify, by using the AI model, that there is an association between display content of the card 311 and display content of the card 1201. Therefore, it may be determined that the card 311 and the card 1201 are associated cards.

When an associated card corresponding to the top card is queried, the mobile phone may preferentially tile the associated card in response to the sliding operation 4. When the associated card corresponding to the top card is not queried, the mobile phone may tile, in response to the sliding operation 4, a display card that is stacked under the top card and that is adjacent to the top card.

Figure 12A:
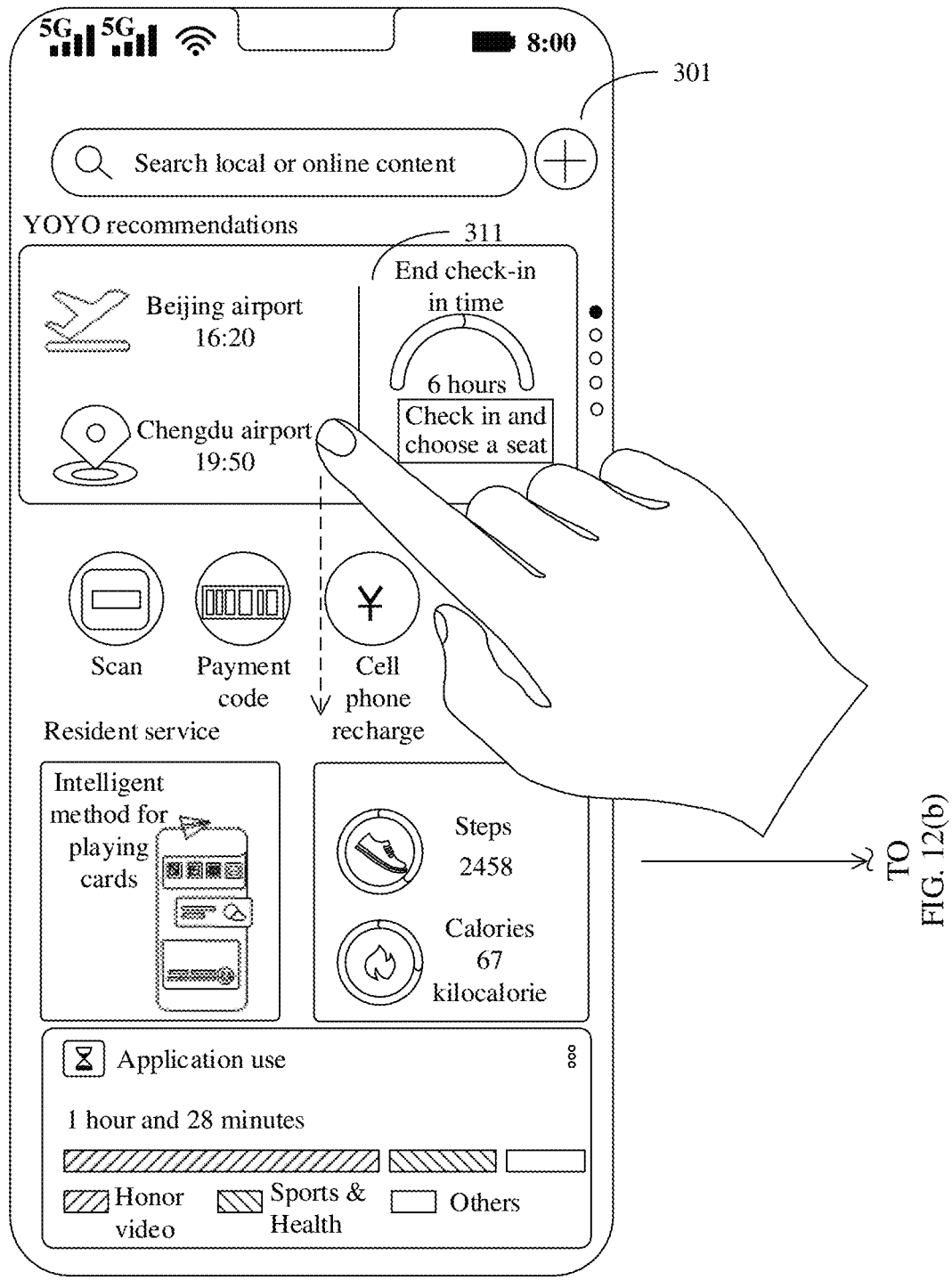
FIG. 12(a) and FIG. 12(b) are an example diagram 8 of display of a mobile phone according to an embodiment of this application.
Figure 12B:
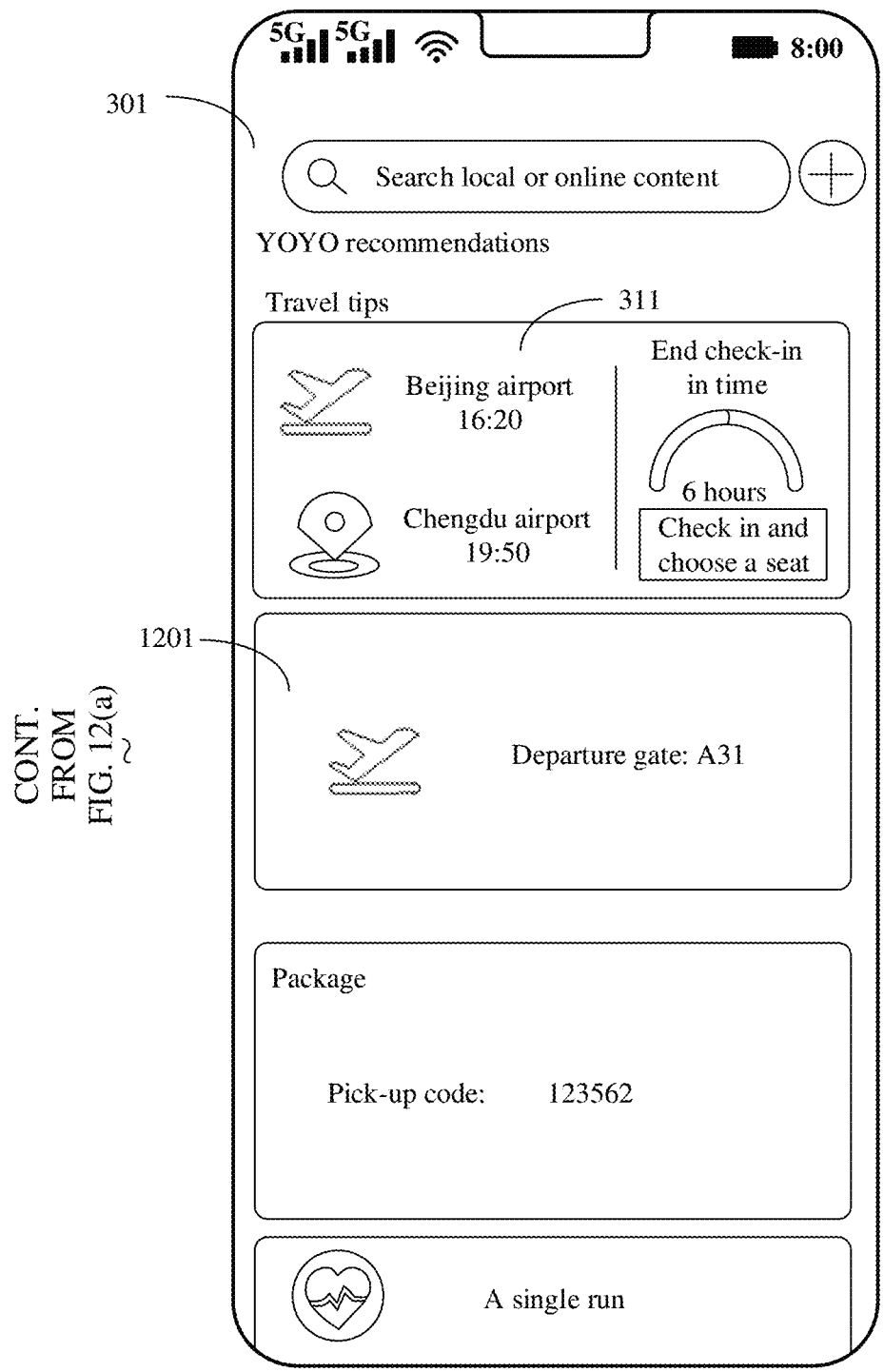

For example, as shown in FIG. 12(a) and FIG. 12(b), when the sliding operation 4 is not received, the card 311 has already been displayed on the leftmost home screen 301. When the mobile phone receives the sliding operation 4, the mobile phone searches the card stack for an associated card of the card 311. When the associated card such as the card 1201 of the card 311 is found, as the track length corresponding to the sliding operation 4 increases, the mobile phone may gradually display the card 1201 on the leftmost home screen 301. In this way, although the card 311 and the card 1201 are not adjacent to each other in the card stack, the card 311 and the card 1201 may be arranged adjacent to each other after being tiled. This is convenient for the user to view the cards.

In other embodiments, when there is only one recommended card in the recommendation area 304, the mobile phone may receive a sliding upward operation performed by the user in the recommendation area 304, and fold the recommended card in response to the sliding upward operation. In this case, display space occupied by the recommendation area 304 decreases. Correspondingly, the function entry icon and the service card also translate upward.

Figure 13A:
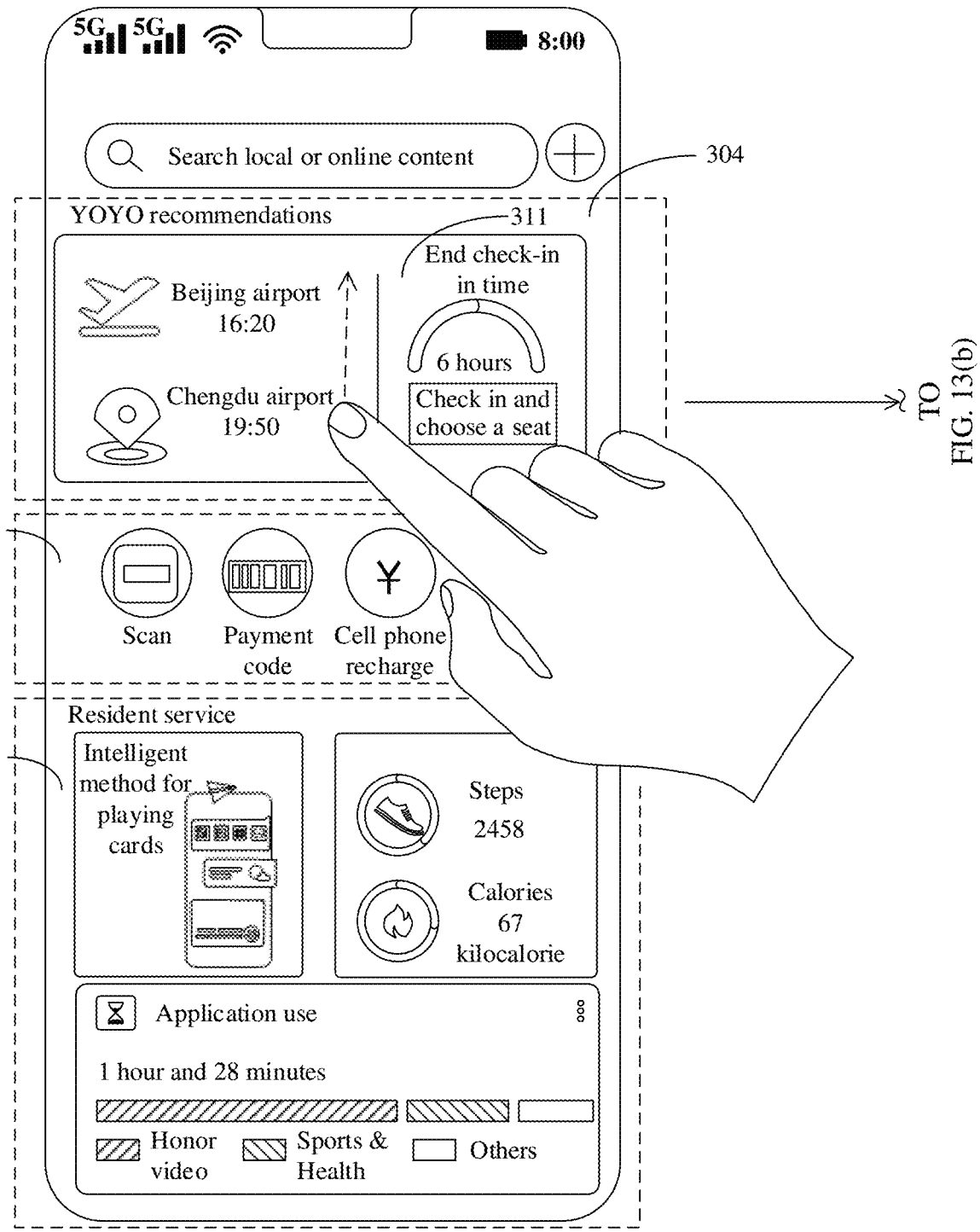
FIG. 13(a) and FIG. 13(b) are an example diagram 9 of display of a mobile phone according to an embodiment of this application.
Figure 13B:
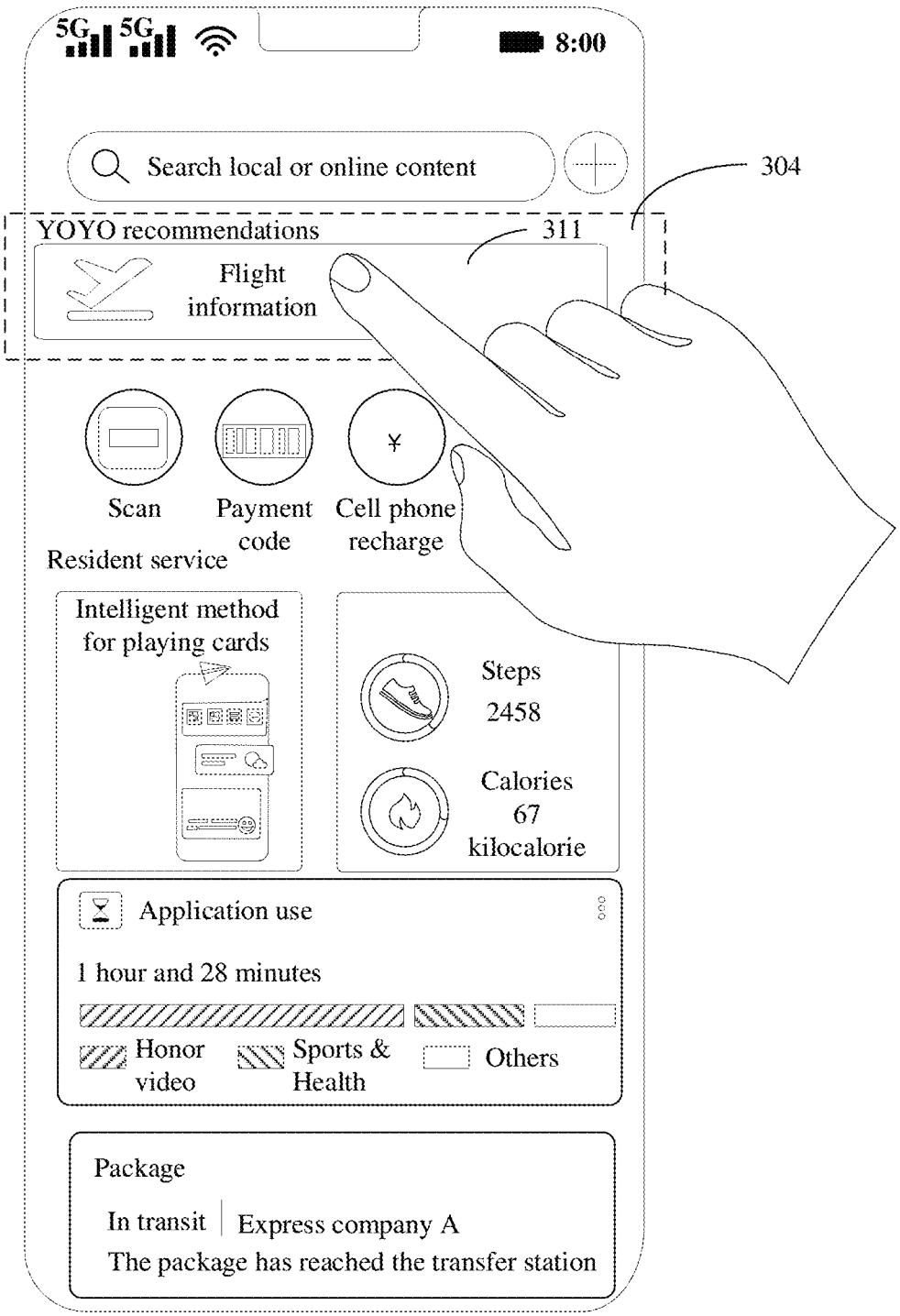

For example, as shown in FIG. 13(a) and FIG. 13(b), when receiving a sliding upward operation performed by the user on the card 311, the mobile phone may fold the card 311, and the folded card 311 may display a digest of card content.

In addition, an embodiment of this application provides a graphical user interface (graphical user interface. GUI) on a computer device. The computer device has a display screen, a touch sensitive surface, a memory, and one or more processors that execute one or more programs stored in a memory. The graphical user interface includes a leftmost home screen, a card stack composed of recommended cards, a service card, and a function entry icon.

In response to detection of a sliding downward operation on the card stack on the leftmost home screen, the recommended cards in the card stack are tiled one by one, and a return control is displayed. In a process of tiling recommended cards, display positions of the service card and the function entry icon move downward synchronously, as shown in FIG. 6A(a), FIG. 6A(b), and FIG. 6A(c), or as shown in (a). (b). (c), and (d) in 9.

Figure 8A:
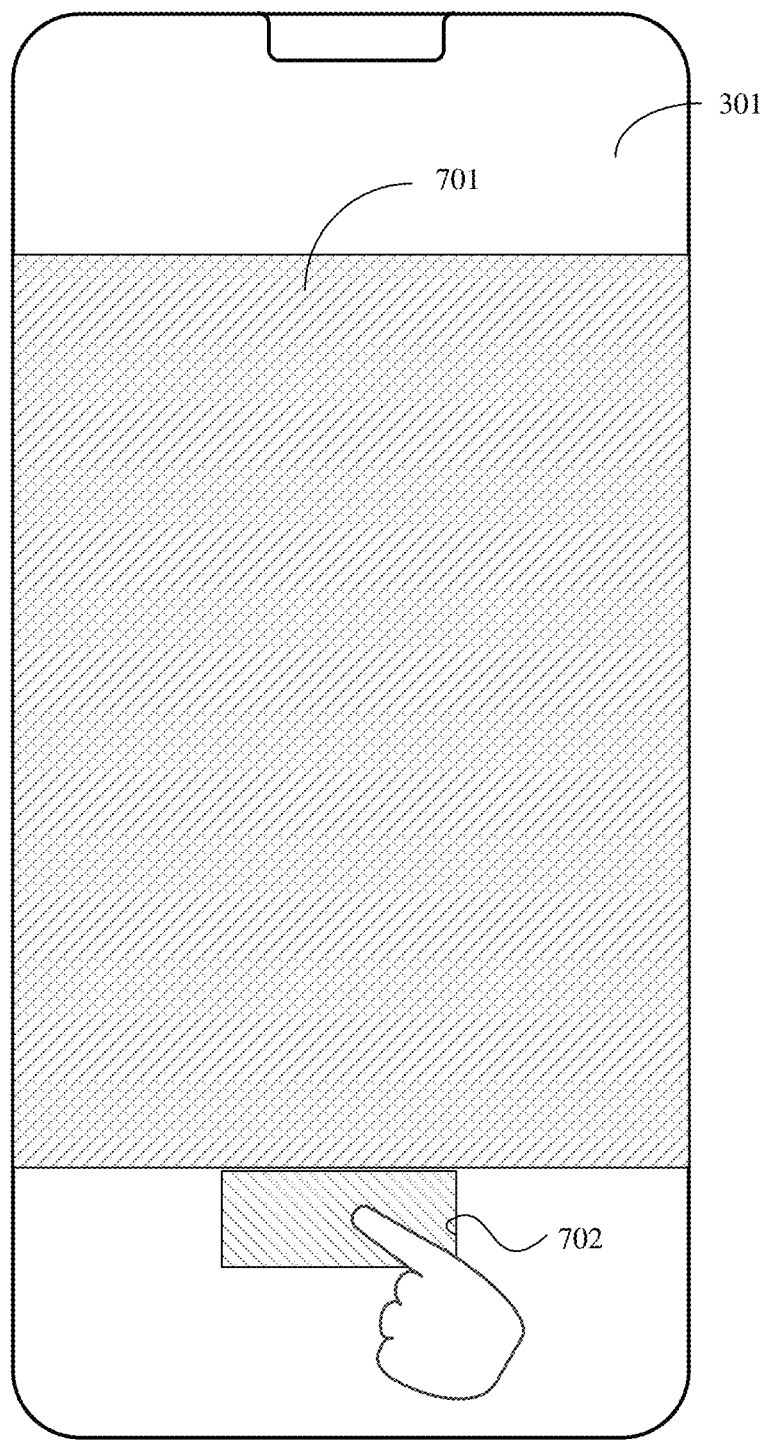
FIG. 8(a), FIG. 8(b), and FIG. 8(c) are an example diagram 4 of display of a mobile phone according to an embodiment of this application.
Figure 8B:
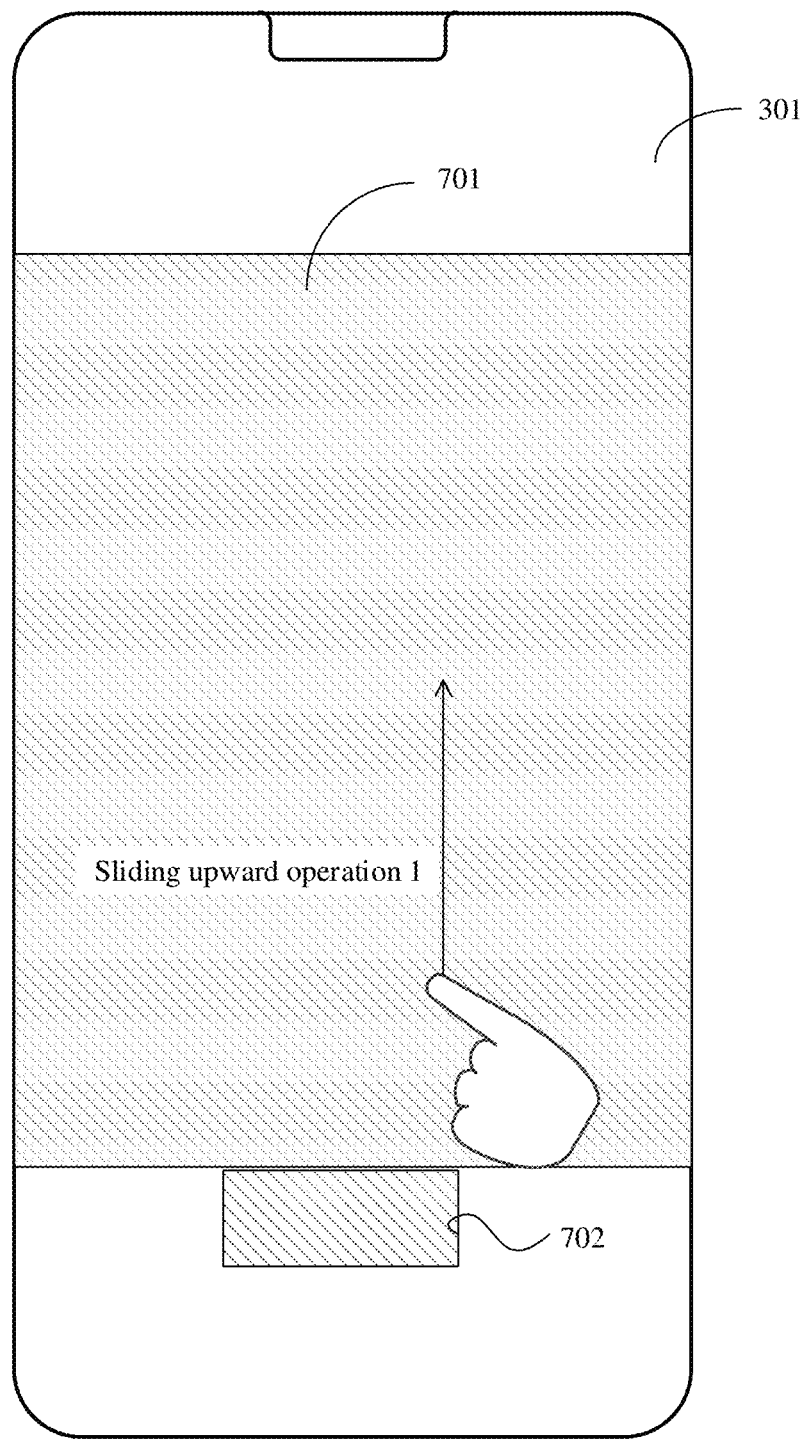
Figure 8C:
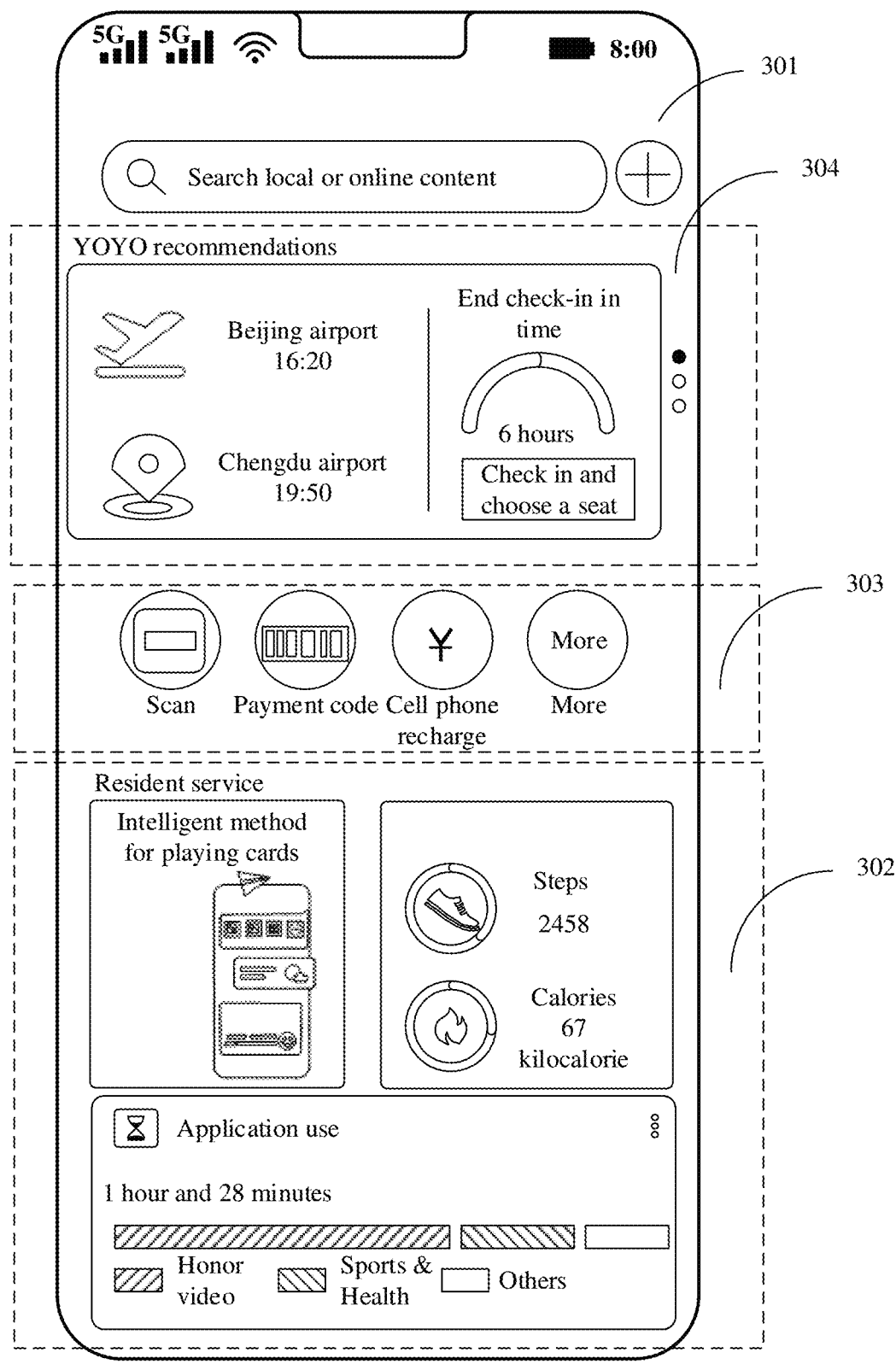

When display space occupied by the tiled recommended cards is less than one screen, as shown in FIG. 7A and FIG. 7B and FIG. 8(a). FIG. 8(b), and FIG. 8(c), the tiled recommended cards are stacked together again in response to detection of a sliding upward operation on the recommended cards, or the tiled recommended cards are stacked again in response to detection of an operation on the return control.

When display space occupied by the tiled recommended cards is not less than one screen, and a recommended card 2 is not completely displayed, as shown in FIG. 10(a)(1). FIG. 10(a)(2). FIG. 10(b)(1), and FIG. 10(b)(2), a hidden recommended card is displayed in response to detection of the sliding upward operation on the recommended card. The recommended card 2 is a card arranged at the bottommost of the tiled recommended cards. In addition, the tiled recommended cards are stacked again in response to detection of the operation on the return control.

Figure 11B:
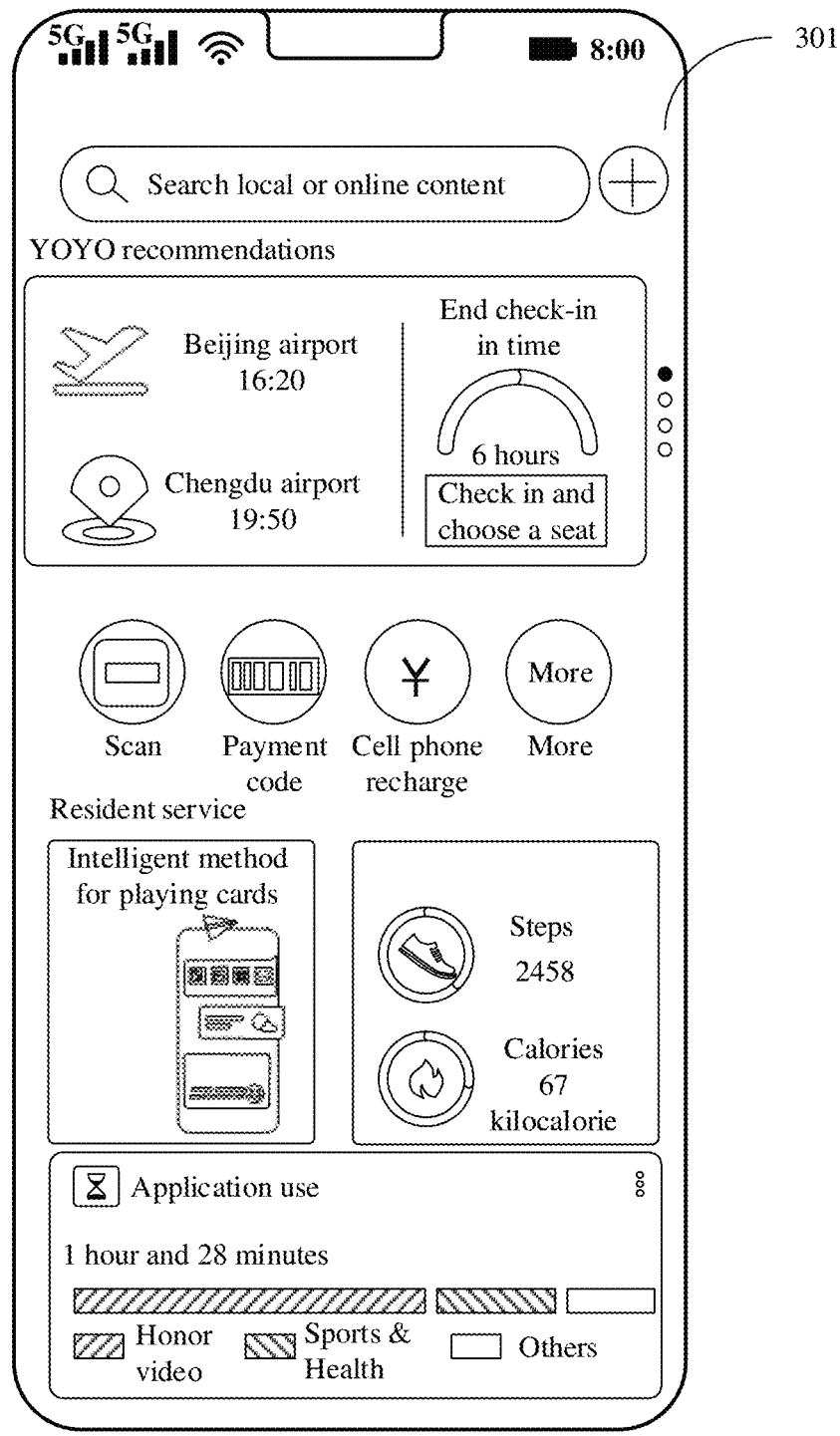
FIG. 11(a)(1), FIG. 11(a)(2), and FIG. 11(b) are an example diagram 7 of display of a mobile phone according to an embodiment of this application.

After the recommended card 2 is completely displayed, as shown in FIG. 11(a)(1). FIG. 11(a)(2), and FIG. 11(b), the tiled recommended cards are stacked again in response to detection of the sliding upward operation on the recommended cards, or the tiled recommended cards are stacked again in response to detection of the operation on the return control.

An embodiment of this application further provides an electronic device. The electronic device may include a memory and one or more processors. The memory is coupled to the processor. The memory is configured to store computer program code, and the computer program code includes a computer instruction. When the processor executes the computer instruction, the electronic device may be enabled to perform the steps performed by the mobile phone in the foregoing embodiments. Certainly, the electronic device includes but is not limited to the foregoing memory and one or more processors. For example, for a structure of the electronic device, refer to the structure of the mobile phone shown in FIG. 1.

Figure 14:
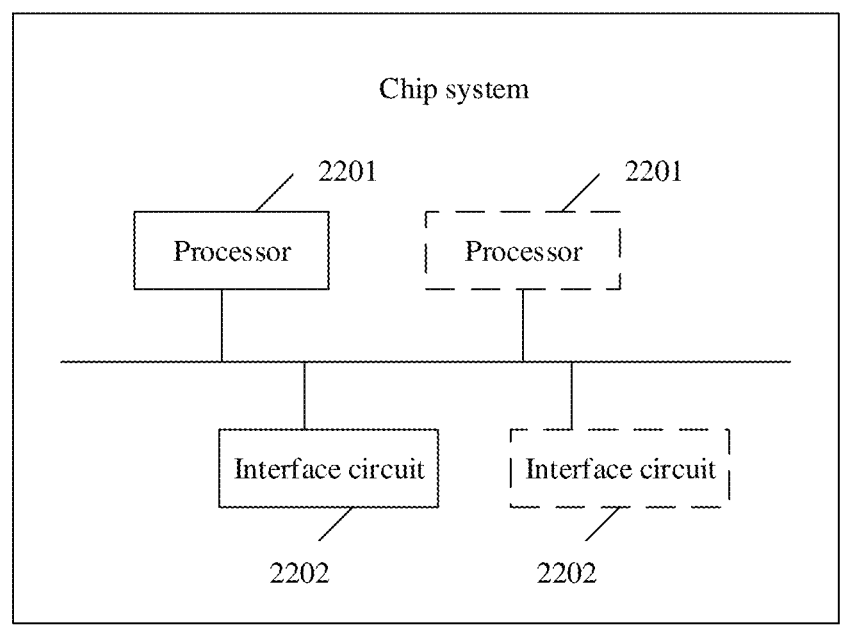
FIG. 14 is a schematic diagram of composition of a chip system according to an embodiment of this application.

An embodiment of this application further provides a chip system, and the chip system may be applied to the electronic device in the foregoing embodiment. As shown in FIG. 14, the chip system includes at least one processor 2201 and at least one interface circuit 2202. The processor 2201 may be the processor in the foregoing electronic device. The processor 2201 and the interface circuit 2202 may be interconnected by using a wire. The processor 2201 may receive a computer instruction from the memory of the foregoing electronic device by using the interface circuit 2202 and execute the computer instruction. When the computer instruction is executed by the processor 2201, the electronic device may be enabled to perform the steps performed by the mobile phone in the foregoing embodiments. Certainly, the chip system may further include another discrete component. This is not specifically limited in this embodiment of this application.

In some embodiments, it may be clearly understood by a person skilled in the art through descriptions of the foregoing implementations that, for ease and brevity of description, division of the foregoing function modules is merely used as an example for description. In actual application, the foregoing functions may be allocated to different function modules based on requirements, that is, an internal structure of the apparatus is divided into different function modules, to complete all or some of the functions described above. For a specific working process of the system, the apparatus, and the unit described above, refer to a corresponding process in the foregoing method embodiments. Details are not described herein again.

Functional units in the embodiments of this application may be integrated into one processing unit, or each unit may exist separately physically, or two or more units may be integrated into one unit. The foregoing integrated unit may be implemented in a form of hardware, or may be implemented in a form of a software functional unit.

The integrated unit may be stored in a computer-readable storage medium when being implemented in the form of a software functional unit and sold or used as an independent product. Based on such an understanding, the technical solutions of the embodiments of this application essentially or the part contributing to a conventional technology or all or a part of the technical solutions may be implemented in a form of a software product. The computer software product is stored in a storage medium and includes several instructions for instructing a computer device (which may be a personal computer, a server, a network device, or the like) or a processor to perform all or some steps in the methods described in the embodiments of this application. The storage medium includes any medium that can store program code, such as a flash memory, a removable hard disk, a read-only memory, a random access memory, a magnetic disk, or an optical disc.

The foregoing is merely specific implementations of the embodiments of this application, but a protection scope of the embodiments of this application is not limited thereto. Any variation or replacement within the technical scope disclosed in the embodiments of this application shall be within the protection scope of the embodiments of this application. Therefore, the protection scope of embodiments of this application shall be subject to the protection scope of the claims.

What is claimed is:

1. A card information display method, wherein the method comprises:
    displaying, by an electronic device, a leftmost home screen, wherein the leftmost home screen comprises a first area, and the first area comprises a plurality of first cards that are displayed as a plurality of stacked first cards and the plurality of first cards are selected as being included in the first area based on respective first information from one or more applications that is associated with each of the plurality of first cards meeting a preset condition, wherein the leftmost home screen comprises a second area comprising at least one second card, wherein the at least one second card is displayed in the second area in response to a user subscribing to an application that is associated with the second card, and wherein the first information comprises at least one of time validity information, fence information, or movement information, and a first card of the plurality of first cards is selected to be pushed to the first area based on when at least one of the time validity information, the fence information, or the movement information in the first information meets a preset condition;
    in response to determining that second information that is displayed in the second area and that is associated with one of the at least one second card matches one of the respective first information, canceling display of a corresponding one of the plurality of first cards;
    in response to receiving, by the electronic device, a first operation when a first height, which is a total height of a plurality of tiled first cards, does not exceed a second height which is a screen display height value of the leftmost home screen,
    displaying, by the electronic device, the plurality of tiled first cards on the leftmost home screen, and
    after displaying the plurality of tiled first cards, displaying, by the electronic device, the plurality of stacked first cards in the first area of the leftmost home screen again in response to a first sliding upward operation; and
    in response to receiving the first operation when the first height of the plurality of first cards exceeds the second height,
    displaying a first part of the plurality of tiled first cards on the leftmost screen,
    after displaying the first part, displaying, by the electronic device, a second part of the plurality of first cards on the leftmost home screen, in response to a received second sliding upward operation,
    in response to receiving a third sliding upward operation after all the plurality of first cards have been displayed on the leftmost home screen, displaying, by the electronic device, the plurality of stacked first cards in the first area of the leftmost home screen again.

2. The method according to claim 1, wherein the second card is arranged under the first card, and before the displaying the plurality of tiled first cards or the displaying a first part of the plurality of tiled first cards, the method further comprises:
    controlling, by the electronic device, the plurality of first cards to be tiled; and
    in a process of tiling the plurality of first cards, controlling, by the electronic device, the second card to translate downward until the second card is hidden.

3. The method according to claim 2, wherein before the displaying the plurality of stacked first cards in the first area again, the method further comprises:
    stacking, by the electronic device, the plurality of first cards based on the first sliding upward operation; and
    in a process of stacking the plurality of first cards, displaying, by the electronic device, the second card on the leftmost home screen, and controlling the second card to translate upward until the second card is displayed in the second area again.

4. The method according to claim 2, wherein
    before the displaying a second part of the plurality of first cards, the method further comprises: controlling, by the electronic device based on the second sliding upward operation, the first card to translate upward; and
    after all the plurality of first cards have been displayed on the leftmost home screen, the method further comprises: stacking, by the electronic device, the plurality of first cards based on the third sliding upward operation; and in a process of stacking the plurality of first cards, displaying, by the electronic device, the second card on the leftmost home screen, and controlling the second card to translate upward until the second card is displayed in the second area again.

5. The method according to claim 1, wherein the method further comprises:

in a period in which the plurality of first cards are stacked and displayed in the first area, responding, by the electronic device, to a received fourth sliding upward operation; and controlling, by the electronic device, the first card and the second card to translate upward on the leftmost home screen, and displaying the second card.

6. The method according to claim 1, wherein a manner in which the time validity information of the first information meets the preset condition comprises: a time period indicated by the time validity information of the first information comprises current system time of the electronic device;

a manner in which the fence information of the first information meets the preset condition comprises: a geographic area indicated by the fence information of the first information comprises a current position of the electronic device; and a manner in which the movement information of the first information meets the preset condition comprises: the movement information of the first information is the same as a current movement state of a user holding the electronic device.

7. The method according to claim 1, wherein the method further comprises:

receiving, by the electronic device, a second operation when the leftmost home screen is displayed;

displaying, by the electronic device, the editable leftmost home screen in response to the second operation;

receiving, by the electronic device, a third operation of the user during display of the editable leftmost home screen; and adding, by the electronic device, a new second card to the second area or deleting the second card from the second area in response to the third operation.

8. The method according to claim 1, wherein the leftmost home screen further comprises a third area, and the third area comprises a function entry icon from one or more applications.

9. The method according to claim 1, wherein the first area further comprises a first identifier, and the first identifier indicates that the plurality of first cards are stacked in the first area.

10. The method according to claim 1, wherein after the displaying the plurality of tiled first cards or the displaying a first part of the plurality of tiled first cards, the method further comprises:

displaying, by the electronic device, a first control on the leftmost home screen, wherein the first control is used to instruct to stack the tiled first cards again.

11. The method according to claim 1, wherein before the displaying the plurality of tiled first cards or the displaying a first part of the plurality of tiled first cards, the method comprises:

determining, by the electronic device, the corresponding first height based on a card quantity of the plurality of first cards.

12. An electronic device, wherein the electronic device comprises one or more processors and a memory, wherein the memory is coupled to the processor, the memory is configured to store computer program code, the computer program code comprises a computer instruction, and when the one or more processors execute the computer instruction, the one or more processors are configured to:

display a leftmost home screen, wherein the leftmost home screen comprises a first area, and the first area comprises a plurality of first cards that are displayed as a plurality of stacked first cards and the plurality of first cards are selected as being included in the first area based on respective first information from one or more applications that is associated with each of the plurality of first cards meeting a preset condition, wherein the leftmost home screen comprises a second area comprising at least one second card, wherein the at least one second card is displayed in the second area in response to a user subscribing to an application that is associated with the second card, and wherein the first information comprises at least one of time validity information, fence information, or movement information, and a first card of the plurality of first cards is selected to be pushed to the first area based on when at least one of the time validity information, the fence information, or the movement information in the first information meets a preset condition;

in response to determining that second information that is displayed in the second area and that is associated with one of the at least one second card matches one of the respective first information, canceling display of a corresponding one of the plurality of first cards;

in response to receiving a first operation when a first height, which is a total height of a plurality of tiled first cards, does not exceed a second height which is a screen display height value of the leftmost home screen, display the plurality of tiled first cards on the leftmost home screen, and after the plurality of tiled first cards are displayed, display the plurality of stacked first cards in the first area of the leftmost home screen again in response to a first sliding upward operation; and in response to receiving the first operation when the first height of the plurality of first cards exceeds the second height, display a first part of the plurality of tiled first cards on the leftmost home screen, after the first part is displayed, display a second part of the plurality of first cards on the leftmost home screen in response to a received second sliding upward operation, and in response to receiving a third sliding upward operation after all the plurality of first cards have been displayed on the leftmost home screen, display the plurality of stacked first cards in the first area of the leftmost home screen again.

13. The electronic device according to claim 12, wherein the second card is arranged under the first card, and before displaying the plurality of tiled first cards or displaying the first part of the plurality of tiled first cards, the one or more processors are further configured to:

control the plurality of first cards to be tiled; and in a process of tiling the plurality of first cards, control the second card to translate downward until the second card is hidden.

14. The electronic device according to claim 13, wherein before displaying the plurality of stacked first cards in the first area again, the one or more processors are further configured to:
- stack the plurality of first cards based on the first sliding upward operation; and
- in a process of stacking the plurality of first cards, display the second card on the leftmost home screen, and control the second card to translate upward until the second card is displayed in the second area again.

15. The electronic device according to claim 13, wherein before displaying the second part of the plurality of first cards, the one or more processors are further configured to control, based on the second sliding upward operation, the first card to translate upward; and
- after all the first cards have been displayed on the leftmost home screen, the one or more processors are further configured to: stack the plurality of first cards based on the third sliding upward operation; and
- in a process of stacking the plurality of first cards, display the second card on the leftmost home screen, and control the second card to translate upward until the second card is displayed in the second area again.

16. The electronic device according to claim 12, wherein the one or more processors are further configured to:
- in a period in which the plurality of first cards are stacked and displayed in the first area, respond to a received fourth sliding upward operation; and
- control the first card and the second card to translate upward on the leftmost home screen, and display the second card.

17. The electronic device according to claim 12, wherein after displaying the plurality of tiled first cards or displaying the first part of the plurality of tiled first cards, the one or more processors are further configured to:
- display a first control on the leftmost home screen, wherein the first control is used to instruct to stack the tiled first cards again.

18. A non-transitory computer storage medium, comprising computer instructions, wherein when the computer instructions are run on an electronic device, the electronic device is enabled to perform the following steps:
- displaying, by an electronic device, a leftmost home screen, wherein the leftmost home screen comprises a first area, and the first area comprises a plurality of first cards that are displayed as a plurality of stacked first cards and the plurality of first cards are selected as being included in the first area based on respective first information from one or more applications that is associated with each of the plurality of first cards meeting a preset condition, wherein the leftmost home screen comprises a second area comprising at least one second card, wherein the at least one second card is displayed in the second area in response to a user subscribing to an application that is associated with the second card, and wherein the first information comprises at least one of time validity information, fence information, or movement information, and a first card of the plurality of first cards is selected to be pushed to the first area based on when at least one of the time validity information, the fence information, or the movement information in the first information meets a preset condition;
- in response to determining that second information that is displayed in the second area and that is associated with one of the at least one second card matches one of the respective first information, canceling display of a corresponding one of the plurality of first cards;
- in response to receiving, by the electronic device, a first operation when a first height, which is a total height of a plurality of tiled first cards, does not exceed a second height which is a screen display height value of the leftmost home screen,
- displaying, by the electronic device, the plurality of tiled first cards on the leftmost home screen, and
- after displaying the plurality of tiled first cards, displaying, by the electronic device, the plurality of stacked first cards in the first area of the leftmost home screen again in response to a first sliding upward operation; and
- in response to receiving the first operation when the first height of the plurality of first cards exceeds the second height,
- displaying a first part of the plurality of tiled first cards on the leftmost screen,
- after displaying the first part, displaying, by the electronic device, a second part of the plurality of first cards on the leftmost home screen in response to a received second sliding upward operation, and
- in response to a receiving a third sliding upward operation after all the plurality of first cards have been displayed on the leftmost home screen, displaying, by the electronic device, the plurality of stacked first cards in the first area of the leftmost home screen again.

* * * * *